US012702967B2

(12) United States Patent
Matsumoto et al.

(10) Patent No.: US 12,702,967 B2
(45) Date of Patent: Aug. 11, 2026

(54) PARTICULATE WATER-ABSORBING AGENT AND METHOD FOR PRODUCING THE SAME

(71) Applicant: NIPPON SHOKUBAI CO., LTD., Osaka (JP)

(72) Inventors: Satoshi Matsumoto, Himeji (JP); Kanako Tsuru, Himeji (JP); Taishi Kobayashi, Himeji (JP); Daisuke Takagi, Himeji (JP); Kazushi Torii, Himeji (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 1122 days.

(21) Appl. No.: 17/774,097

(22) PCT Filed: Nov. 12, 2020

(86) PCT No.: PCT/JP2020/042263

§ 371 (c)(1),
(2) Date: May 3, 2022

(87) PCT Pub. No.: WO2021/095806

PCT Pub. Date: May 20, 2021

(65) Prior Publication Data

US 2022/0387971 A1 Dec. 8, 2022

(30) Foreign Application Priority Data

Nov. 12, 2019 (JP) ................................ 2019-204870

(51) Int. Cl.

| | |
|---|---|
| ***B01J 20/26*** | (2006.01) |
| ***B01J 20/02*** | (2006.01) |
| ***B01J 20/28*** | (2006.01) |
| ***B01J 20/30*** | (2006.01) |

(52) U.S. Cl.

CPC ............. *B01J 20/267* (2013.01); *B01J 20/02* (2013.01); *B01J 20/28004* (2013.01); *B01J 20/28016* (2013.01); *B01J 20/3021* (2013.01); *B01J 20/3085* (2013.01)

(58) Field of Classification Search

CPC ...... C08F 220/06; C08F 222/102; C08K 3/30; C08K 5/16; C08K 5/09; C08L 33/02

See application file for complete search history.

(56) References Cited

U.S. PATENT DOCUMENTS

| | | | | |
|---|---|---|---|---|
| 7,737,231 | B2 | 6/2010 | Handa et al. | |
| 9,796,853 | B2 * | 10/2017 | Ueda | A61L 15/18 |
| 9,974,882 | B2 | 5/2018 | Machida et al. | |
| 2005/0085604 | A1 | 4/2005 | Handa et al. | |
| 2007/0106013 | A1 * | 5/2007 | Adachi | A61L 15/60 524/556 |
| 2007/0111004 | A1 | 5/2007 | Handa et al. | |
| 2009/0275470 | A1 | 11/2009 | Nagasawa et al. | |
| 2010/0093917 | A1 * | 4/2010 | Torii | B01J 20/267 524/539 |
| 2010/0249320 | A1 * | 9/2010 | Matsumoto | F26B 3/08 524/832 |
| 2014/0193641 | A1 * | 7/2014 | Torii | A61L 15/26 252/194 |
| 2017/0014801 | A1 | 1/2017 | Ikeuchi et al. | |
| 2018/0161756 | A1 * | 6/2018 | Omori | B01J 20/28011 |
| 2019/0105633 | A1 | 4/2019 | Tamaki et al. | |

FOREIGN PATENT DOCUMENTS

| | | | |
|---|---|---|---|
| CN | 105658323 | A | 6/2016 |
| EP | 3056268 | A1 | 8/2016 |
| JP | 2005029751 | A | 2/2000 |
| JP | 2003206305 | A | 7/2003 |
| JP | 2016112475 | A | 6/2016 |
| WO | 2009005114 | A1 | 1/2009 |

(Continued)

OTHER PUBLICATIONS

Extended European Search Report dated Apr. 3, 2023, which issued in the corresponding European Patent Application No. 20888261.3.

Japanese Office Action dated Jan. 31, 2023, which issued in the corresponding Japanese Patent Application No. 2021-556147, including English translation.

Indonesian Office Action dated Jul. 20, 2023, which issued in the corresponding Indonesian Patent Application No. P00202205318.

Indian Examination Reported dated Jun. 23, 2022, which issued in corresponding Indian Patent Application No. 202247026354, including Eng. translation.

Indian Hearing Notice dated Nov. 14, 2023, which issued in the Indian Patent Application No. 202247026354, including Eng. translation.

(Continued)

*Primary Examiner* — Joseph D Anthony

(74) *Attorney, Agent, or Firm* — Dickinson Wright PLLC

(57) ABSTRACT

[Problem] In an embodiment involving addition of a chelating agent in an upstream process of the process for production, such as the polymerization step, the residual ratio of the chelating agent in the final product, a particulate water-absorbing agent, is improved.

[Solution] A particulate water-absorbing agent having a poly(meth)acrylic acid (salt)-based water-absorbing resin as a main component, containing a chelating agent having a nitrogen atom and an inorganic reducing agent having a sulfur atom, wherein the particulate water-absorbing agent has a chelating agent ratio of 0.8 to 1.8, as calculated by the following procedures (a) to (c): (a) subjecting the particulate water-absorbing agent to a predetermined impact test; (b) sieving the particulate water-absorbing agent subjected to the impact test into a particle group 1 with a particle size of less than 300 μm and a particle group 2 with a particle size of 300 μm or more and less than 850 μm using a JIS standard sieve; and (c) quantifying a content C1 of the chelating agent present in the particle group 1 and a content C2 of the chelating agent present in the particle group 2, and then dividing the C1 by the C2.

10 Claims, No Drawings

(56) References Cited

FOREIGN PATENT DOCUMENTS

| | | | |
|---|---|---|---|
| WO | 2011040530 | A1 | 4/2011 |
| WO | 2015053372 | A1 | 4/2015 |
| WO | 2015129917 | A1 | 9/2015 |
| WO | 2017170604 | A1 | 10/2017 |

OTHER PUBLICATIONS

Indonesian Substantive Examination Report dated Feb. 16, 2023, which issued in the corresponding Indonesian Patent Application No. P00202205318, including English translation.

Chinese Office Action dated Mar. 27, 2024, which issued in the corresponding Chinese Patent Application No. 202080078727.5, including English translation.

Chinese Office Action dated Sep. 30, 2024, which issued in the corresponding Chinese Patent Application No. 202080078727.5, including English translation.

International Search Report and Written Opinion dated Jan. 19, 2021, which issued in the corresponding Japanese Patent Application No. PCT/JP2020/042263.

* cited by examiner

PARTICULATE WATER-ABSORBING AGENT AND METHOD FOR PRODUCING THE SAME

TECHNICAL FIELD

The present invention relates to a particulate water-absorbing agent and a method for producing the same.

BACKGROUND ART

A water-absorbing resin (SAP/Super Absorbent Polymer) is a water swellable and water insoluble polymer gelling agent and is widely used mainly in disposable applications including absorbing articles such as a disposable diaper and a sanitary napkin, as well as water retention agents for agriculture and horticulture, and industrial water-stopping materials.

Such a water-absorbing resin is produced through a polymerization step, a drying step, a pulverizing step, a classification step, a surface crosslinking step, and the like, but the water-absorbing resin is required to have many functions along with functional sophistication of a disposable diaper that is a main application of the water-absorbing resin. Specifically, the performance thereof is not limited to mere high fluid retention capacity, but also includes gel strength, water absorbent speed, absorption capacity under load, liquid permeability, antibacterial properties, impact resistance, powder fluidity, deodorization properties, coloration resistance (degree of whiteness), and low dustiness.

Additives are sometimes used to improve the above performance of the water-absorbing resin, and it is known that a chelating agent is added to the water-absorbing resin for the purpose of improving color tone stability of the water-absorbing resin, and the like (e.g., Patent Literatures 1 to 5).

CITATION LIST

Patent Literature

[Patent Literature 1]
International Publication No. WO 2011/040530
[Patent Literature 2]
International Publication No. WO 2015/053372
[Patent Literature 3]
Japanese Patent Laid-Open No. 2003-206305
[Patent Literature 4]
Japanese Patent Laid-Open No. 2005-029751
[Patent Literature 5]
International Publication No. WO 2009/005114

SUMMARY OF INVENTION

Technical Problem

In the process of studying the addition of a chelating agent, the present inventors have found it difficult to obtain a sufficient effect in the final product for the amount of a chelating agent added when the chelating agent is added in an upstream process of the production process, such as the polymerization step. The cause of this problem was found to be that an amount of the chelating agent corresponding to the amount of the chelating agent added in the polymerization process and the like was not contained in the water-absorbing resin as the final product. Furthermore, it was found that the cause of the absence of the prescribed amount of the chelating agent in the water-absorbing resin as the final product was decomposition of the chelating agent, and that decomposition products of the chelating agent contributed to deterioration of the color tone of the water-absorbing resin as the final product. On the other hand, it was also found that color tone stability of the water-absorbing resin as the final product is insufficient if the chelating agent is added at the downstream of the production process or if the chelating agent is distributed unevenly.

The present invention has been developed for the purpose of solving at least one of the above problems, and provides: a particulate water-absorbing agent with a homogeneous distribution of a chelating agent and with a few decomposition products of the chelating agent, a white particulate water-absorbing agent with a homogeneous distribution of the chelating agent; or a particulate water-absorbing agent in which the chelating agent exhibits desired effects (e.g., color tone stability and prevention of urine degradation). Alternatively, the problem is to provide a method for producing a particulate water-absorbing agent that improves the residual ratio of the chelating agent in the final product, the particulate water-absorbing agent, in an embodiment involving addition of the chelating agent in the upstream process of the production process, such as the polymerization step.

Solution to Problem

In order to solve the problems found in this study, the present inventors investigated the causes. As a result, the inventors have found that at least one of the above problems can be solved by the configuration of a particulate water-absorbing agent having a poly(meth)acrylic acid (salt)-based water-absorbing resin as a main component, comprising a chelating agent having a nitrogen atom and an inorganic reducing agent having a sulfur atom, wherein the particulate water-absorbing agent has a chelating agent ratio of 0.8 to 1.8, as calculated by the following procedures (a) to (c): (a) subjecting the particulate water-absorbing agent to a predetermined impact test; (b) sieving the particulate water-absorbing agent subjected to the impact test into a particle group 1 with a particle size of less than 300 μm and a particle group 2 with a particle size of 300 μm or more and less than 850 μm using a JIS standard sieve; and (c) quantifying a content C1 of the chelating agent present in the particle group 1 and a content C2 of the chelating agent present in the particle group 2, and then dividing the C1 by the C2. Thus, the present invention has been completed.

In addition, the inventors have found that at least one of the above problems can be solved by the configuration of a method for producing a particulate water-absorbing agent having a poly(meth)acrylic acid (salt)-based water-absorbing resin as a main component, comprising a chelating agent having a nitrogen atom and an inorganic reducing agent having a sulfur atom, the method comprising: a step of making a chelating agent ratio to be 0.8 to 1.8. Thus, the production method of present invention has been completed.

Advantageous Effect of Invention

According to one embodiment of the present invention, it is possible to provide a particulate water-absorbing agent with a homogeneous distribution of a chelating agent and with a few decomposition products of the chelating agent; a white particulate water-absorbing agent with a homogeneous distribution of the chelating agent; or a particulate water-absorbing agent in which the chelating agent exhibits desired effects (e.g., color tone stability and prevention of urine degradation). Alternatively, it is possible to provide a method for producing a particulate water-absorbing agent that improves the residual ratio of the chelating agent in the final product, the particulate water-absorbing agent, in an embodiment involving addition of the chelating agent in the upstream process of the production process, such as the polymerization step.

DESCRIPTION OF EMBODIMENTS

Hereinafter, a method for producing the water-absorbing resin containing the chelating agent of the present invention will be described in detail; however, the scope of the present invention can be appropriately modified, without being restricted by these descriptions, to the extent that the gist of the present invention is maintained even in examples other than the following illustrated examples. Specifically, the present invention is not intended to be limited to the following embodiments, and can be modified in many ways within the scope indicated in the claims. The technical scope of the present invention encompasses any embodiments that can be obtained by appropriately combining technical means disclosed in different embodiments.

[1] Various Definitions

[1-1] Water-Absorbing Resin

In the present specification, "water-absorbing resin" refers to a polymer gelling agent having a water swellable capacity (CRC) as defined in ERT441.2-02 of 5 g/g or more and a water insolubility as defined in ERT441.2-02 (Ext) of 50% by mass or less.

In the present specification, "water-absorbing resin" is not limited to an aspect in which the entire amount (100% by mass) is the water-absorbing resin. The water-absorbing resin may be a water-absorbing resin composition comprising an additive or the like. In the present specification "water-absorbing resin" is a concept that also encompasses intermediates in a production process of a water-absorbing resin. For example, hydrogel-forming crosslinked polymers after polymerization, a dry polymer after drying, water-absorbing resin powder before surface crosslinking, and the like may also be described as "water-absorbing resin".

[1-2] Water-Absorbing Agent and Particulate Water-Absorbing Agent

In the present specification, "water-absorbing agent" means an absorbing gelling agent for absorbing an aqueous liquid (liquid), comprising a water-absorbing resin as a main component. Here, the aqueous liquid (liquid) is not limited to water, but any liquid containing water.

In the present specification, "particulate water-absorbing agent" means a water-absorbing agent in the form of particles. The concept of "particulate water-absorbing agent" encompasses both a single particulate water-absorbing agent and an aggregate of multiple particulate water-absorbing agents. In the present specification, "particulate" means having the form of a particle. Here, "particle" a relatively small division of a substance and has a size of a few Å to a few mm (see "Particle", edited by the Editorial Board of McGraw-Hill Dictionary of Scientific and Technical Terms, *McGraw-Hill Dictionary of Scientific and Technical Terms,* 3rd ed. Nikkan Kogyo Shimbun, Ltd., 1996, p. 1929). Note that in the present specification, "particulate water-absorbing agent" may be simply described as a "water-absorbing agent".

The particulate water-absorbing agent comprises, as a main component, a water-absorbing resin as a polymer. The particulate water-absorbing agent includes generally 50% by mass or more, preferably 70% by mass or more, more preferably 80% by mass or more, still more preferably 90% by mass or more, and particularly preferably 95% by mass or more of the water-absorbing resin as a polymer. The remainder of the particulate water-absorbing agent may be a water-absorbing resin composition optionally containing water, additives (such as inorganic fine particles), and the like.

The upper limit of a water-absorbing resin in a particulate water-absorbing agent is, for example, 99.999% by mass, 99% by mass, 97% by mass, 95% by mass, and 90% by mass, and preferably, 0 to 10% by mass of components other than the water-absorbing resin, especially water, additives (inorganic fine particles or polyvalent metal cation), and the like are further included.

Note that a preferred moisture content of the particulate water-absorbing agent is 0.2 to 30% by mass. A water-absorbing resin composition in which components such as water and additives are integrated with the water-absorbing resin are also encompassed by "particulate water-absorbing agent".

[1-3] Poly(meth)acrylic Acid (Salt)

In the present specification, "poly(meth)acrylic acid (salt)" refers to a poly(meth)acrylic acid and/or a salt thereof. A poly(meth)acrylic acid (salt) resin is a polymer comprising a repeating unit derived from a (meth)acrylic acid and/or a salt thereof (hereinafter, referred to as "(meth) acrylic acid (salt)") as a main component, and further comprising a graft component as an optional component. The poly(meth)acrylic acid (salt) is obtained by polymerization of (meth)acrylic acid (salt) and hydrolysis of polyacrylamide or polyacrylonitrile, and the like. Preferably, the poly(meth)acrylic acid is obtained by polymerization of (meth)acrylic acid (salt). Here, "comprising as a main component" refers to the amount of acrylic acid (salt) used of generally 50 to 100 mol %, preferably 70 to 100 mol %, more preferably 90 to 100 mol %, and still more preferably substantially 100 mol % relative to the whole monomer used in polymerization (but excluding the internal crosslinking agent).

[1-4] EDANA and ERT

"EDANA" is the abbreviation for the European Disposables and Nonwovens Associations. "ERT" is the abbreviation for a European standard (substantially global standard) measurement method of water-absorbing resins (EDANA Recommended Test Methods), which is established by EDANA. Herein, physical properties of the water-absorbing resins are measured in accordance with the 2002 edition of ERT, unless otherwise specified.

[1-5] Others

In the present specification, "X to Y" indicating a range means "X or more and Y or less". In the present specification, unless specifically noted otherwise, the unit of mass "t (ton)" means "metric ton". "ppm" means "ppm by mass". Each of "mass" and "weight", "parts by mass" and "parts by weight", "% by mass" and "% by weight", and "ppm by mass" and "weight ppm" is considered a synonym. In the present specification, " . . . acid (salt)" means " . . . acid and/or a salt thereof". "(Meth)acryl" means "acryl and/or methacryl". In the present specification, the unit of volume "liter" may be described as "l" or "L". "% by mass" may be described as "wt %". Upon measurement of a trace amount of a component, detection limit of lower is described as N.D. (Non Detected), while no measurement is described as N/A (Not Available).

[2] Particulate Water-Absorbing Agent

The particulate water-absorbing agent in one embodiment of the present invention having a poly(meth)acrylic acid (salt)-based water-absorbing resin as a main component, comprising a chelating agent having a nitrogen atom and an inorganic reducing agent having a sulfur atom, wherein the particulate water-absorbing agent has a chelating agent ratio of 0.8 to 1.8, as calculated by the following procedures (a) to (c). Here, the procedures include: (a) subjecting the particulate water-absorbing agent to a predetermined impact test; (b) sieving the particulate water-absorbing agent subjected to the impact test into a particle group 1 with a particle size of less than 300 μm and a particle group 2 with a particle size of 300 μm or more and less than 850 μm using a JIS standard sieve; and (c) quantifying a content C1 of the chelating agent present in the particle group 1 and a content C2 of the chelating agent present in the particle group 2, and then dividing the C1 by the C2. Note that the predetermined impact test is based on the method of [Impact Test] described in Examples. In the present invention, it is essential that both of the particle group 1 and the particle group 2 are obtained by sieving in (b). In order to achieve this, it is preferable that the particulate water-absorbing agent has the particle size described later. In addition, the water-absorbing resin usually has a strength enough to prevent the particle group 2 from being completely lost in the predetermined impact test. Furthermore, the contents C1 and C2 of the chelating agent are contents calculated by assuming that the chelating agent appears at the time of addition when the chelating agent is a nonionic type, and that the chelating agent is present as an acid type in the particulate water-absorbing agent when the chelating agent is an anionic type.

According to one embodiment of the present invention, the lower limit of the chelating agent ratio (C1/C2) is 0.8 or more and may be 0.9 or more, or 1.0 or more. On the other hand, the upper limit is required to be 1.8 or less, and is preferably 1.6 or less, 1.5 or less, 1.4 or less, 1.3 or less, 1.2 or less, or 1.1 or less. If the value exceeds 1.8, there is a risk of failure to improve color tone of a water-absorbing resin. Note that a chelating agent ratio of 0.8 to 1.8 means, in plain terms, that chelating agent is homogeneously present in the water-absorbing resin. The presence of the chelating agent can also be confirmed by gradually scraping the water-absorbing resin from the surface of the particle to the inside of the particle to analyze the crushed chips. Note that in the present specification, the “predetermined impact test” is based on the method described in Examples of the present application.

[Chelating Agent]

In one embodiment of the present invention, the particulate water-absorbing agent comprises a chelating agent having a nitrogen atom (herein, also simply referred to as a “chelating agent”). Although a chelating agent that does not contain a nitrogen atom is also known, the desired effect of the present invention cannot be achieved by using such a chelating agent.

In one embodiment of the present invention, the chelating agent is at least one compound selected from the group consisting of amino-polyvalent carboxylic acids and amino-polyvalent phosphoric acids. Note that the “polyvalent” refers to having multiple functional groups in one molecule, and preferably 2 to 30, more preferably 3 to 20, still more preferably 4 to 10, and further still more preferably 5 to 9 functional groups.

From the viewpoints of its influence on polymerization and physical properties of the resulting particulate water-absorbing agent, the chelating agent preferably has a molecular weight of 100 to 5,000, and more preferably 150 to 1,000.

Specific examples of the amino-polyvalent carboxylic acid include iminodiacetic acid, hydroxyethyliminodiacetic acid, nitrilotriacetic acid, nitrilotripropionic acid, ethylenediaminetetraacetic acid, diethylenetriaminepentaacetic acid, triethylenetetraminehexaacetic acid, trans-1,2-diaminocyclohexanetetraacetic acid, N,N-bis(2-hydroxyethyl)glycine, diaminopropanoltetraacetic acid, ethylenediaminedipropionic acid, N-hydroxyethylethylenediaminetriacetic acid, glycol ether diamine tetraacetic acid, diaminopropanetetraacetic acid, N,N'-bis(2-hydroxybenzyl)ethylenediamine-N,N'-diacetic acid, 1,6-hexamethylenediamine-N,N,N',N'-tetraacetic acid, and salts thereof.

Specific examples of the amino-polyvalent phosphoric acid include ethylenediamine-N,N'-di(methylenephosphinic acid), ethylenediamine tetra(methylenephosphinic acid), cyclohexanediaminetetra(methylenephosphonic acid), ethylenediamine-N,N'-diacetic acid-N,N'-di(methylenephosphonic acid), ethylenediamine-N,N'-di(methylenephosphonic acid), ethylenediamine tetra(methylenephosphonic acid), polymethylenediaminetetra(methylenephosphonic acid), diethylenetriaminepenta(methylenephosphonic acid), and salts thereof.

Among these, an amino-polyvalent carboxylic acid-based chelating agent having four or more (five or more) carboxyl groups or an amino-polyvalent phosphoric acid-based chelating agent having four or more (five or more) phosphonic acid groups is preferred from the viewpoints of prevention of coloration and gel stability. In one embodiment of the present invention, diethylenetriaminepentaacetic acid, nitrilotriacetic acid, triethylenetetraminehexaacetic acid, ethylenediamine tetra(methylenephosphonic acid), and salts thereof are still more preferred from the viewpoints of prevention of coloration and gel stability. From the viewpoints of preventing coloration and further increasing the residual ratio of the chelating agent, diethylenetriaminepentaacetic acid or a salt thereof is particularly preferred.

In one embodiment of the present invention, salts of the chelating agents include, but are not limited to, sodium.

Note that in the present invention, unless otherwise specified, the content of the chelating agent described later and the amount added are contents calculated by assuming that the chelating agent appears at the time of addition when the chelating agent is a nonionic type, and that the chelating agent is present as an acid type when the chelating agent is an anionic type.

[Inorganic Reducing Agent Having Sulfur Atom]

Examples of inorganic reducing agents having a sulfur atom (in the present specification, also simply referred to as an “inorganic reducing agent”) include compounds having a reductive sulfur atom. In one embodiment of the present invention, the number of sulfur atoms in one molecule of the inorganic reducing agent is one to three, one or two, or one. From the viewpoint of efficiently achieving the desired effect of the present invention, one is preferred.

In one embodiment of the present invention, the inorganic reducing agent may be either an acid or a salt type, but is preferably a salt type, more preferably a monovalent or polyvalent metal salt, and still more preferably a monovalent metal salt. Among them, oxygen-containing reductive inorganic compounds exemplified below, that is, inorganic reducing agents in which sulfur is bound to oxygen, are preferred, and oxygen-containing reductive inorganic salts are more preferred.

In one embodiment of the present invention, examples of inorganic reducing agents having the reductive sulfur atom include sulfur compounds having a value of +4 (e.g., sulfite, hydrogen sulfite, or pyrosulfite), sulfur compounds having a value of +3 (e.g., dithionite), and +sulfur compounds having a value of +2 (e.g., sulfoxylate). Note that sulfur compounds having the oxidation number of +6 (positive hexavalent) are most stable, and in general, various atoms having oxidation numbers less than the value have reducing properties.

In one embodiment of the present invention, examples of the inorganic reducing agents having the reductive sulfur atoms include, but not particularly limited to, inorganic compounds of sulfites such as sodium sulfite, potassium sulfite, calcium sulfite, zinc sulfite, and ammonium sulfite; hydrogen sulfites such as sodium hydrogen sulfite, potassium hydrogen sulfite, calcium hydrogen sulfite, and ammonium hydrogen sulfite; pyrosulfites such as sodium pyrosulfite, potassium pyrosulfite, and ammonium pyrosulfite; dithionites such as sodium dithionite, potassium dithionite, ammonium dithionite, calcium dithionite, and zinc dithionite; trithionates such as potassium trithionate and sodium trithionate; tetrathionates such as potassium tetrathionate and sodium tetrathionate; and thiosulfates such as sodium thiosulfate, potassium thiosulfate, and ammonium thiosulfate. These may be in hydrate form.

In one embodiment of the present invention, sulfite or hydrogen sulfite is preferred as an inorganic reducing agent because of its ease of handling and initial color tone. In one embodiment of the present invention, salts are preferably alkali metals and alkaline earth metals, more preferably lithium salts, sodium salts, and potassium salts, and particularly preferably sodium salts.

Note that, the description in [1-2] above can be applied to the description of "the main component is a poly(meth) acrylic acid (salt)-based water-absorbing resin", and as for the method for producing the poly(meth)acrylic acid (salt)-based water-absorbing resin, the description in [3] Method for Producing Particulate Water-Absorbing Agent described below can be applied.

[Particle Size of Particulate Water-Absorbing Agent]

In one embodiment of the present invention, a mass-average particle size (D50) of the particulate water-absorbing agent is preferably 200 to 600 μm, more preferably 200 to 550 μm, and still more preferably 250 to 500 μm.

In one embodiment of the present invention, the proportion of particles (fine particles) with a particle size of less than 150 μm in the particulate water-absorbing agent is controlled to be 5% by mass or less, 3% by mass or less, or 1% by mass or less (the lower limit is 0% by mass). Note that the proportion of particles with a particle size of less than 850 μm is generally 90 to 100% by mass and preferably 95 to 100% by mass of the total. Therefore, the particulate water-absorbing agent with a particle size of less than 850 μm used in the measurement of the chelating agent ratio of the present invention is representative of the properties of particulate water-absorbing agents.

In one embodiment of the present invention, a mass ratio of particles with a particle size of less than 300 μm to particles with a particle size of 300 μm or more and less than 850 μm in the particulate water-absorbing agent is preferably 70:30 to 10:90, more preferably 60:40 to 15:85, still more preferably 50:50 to 20:80, and particularly preferably 40:60 to 25:75. Note that the "particle with a particle size of less than 300 μm" refers to a particulate water-absorbing agent that passes through a JIS standard sieve with a mesh size of 300 μm, and the "particle with a particle size of 300 μm or more and less than 850 μm" refers to a particulate water-absorbing agent that passes through a JIS standard sieve with a mesh size of 850 μm and then remains on a JIS standard sieve with a mesh size of 300 μm.

In one embodiment of the present invention, the proportion of particles with a particle size of 150 μm or more and less than 850 μm, as defined by a JIS standard sieve, among particulate water-absorbing agents is preferably 90% by mass or more, more preferably 95% by mass or more, and still more preferably 98% by mass or more.

In one embodiment of the present invention, the logarithmic standard deviation (σζ) of particle size distribution of a particulate water-absorbing agent is preferably controlled to be 0.20 to 0.50, more preferably 0.25 to 0.45, and still more preferably 0.27 to 0.40.

[Monomer Addition Ratio]

In one embodiment of the present invention, the particulate water-absorbing agent is obtained by polymerizing monomers in an aqueous monomer solution containing a chelating agent having a nitrogen atom to which a chelating agent having a nitrogen atom is added, and an amount C3 of the chelating agent added to the aqueous monomer solution (relative to the monomer solid content) is 50% by mass or more relative to the total amount C5 of the chelating agent added in the production process of a particulate water-absorbing agent, and a content C6 of the chelating agent relative to the solid content of the particulate water-absorbing agent is 50% by mass or more of the C5. Such an embodiment makes it easier to obtain a sufficient effect in the final product for the amount of a chelating agent added when the chelating agent is added in an upstream process of the production process, such as the polymerization step.

In this embodiment, the C3 is more preferably 60% by mass or more, and still more preferably 70% by mass or more, 80% by mass or more, or 90% by mass or more relative to the C5. According to such an embodiment, the chelating agent ratio may be in the range of 0.8 to 1.8. Since polymerization is stable, particulate water-absorbing agents with high physical properties are also likely to be obtained. Note that the amount of a chelating agent added relative to monomer solids content contained in the aqueous monomer solution, and the C5 is the total amount of chelating agents added in the production process of the particulate water-absorbing agent, converted into the amount of the chelating agents added relative to the solid content of the monomer or water-absorbing resin at each addition. To describe in detail "at each addition" in the left column, the amount of the chelating agent added means the amount of the chelating agents added relative to the solid content of the water-absorbing resin or monomer at the time of addition. The amount of the chelating agent added is the sum of the amount added (C3) relative to the monomer solid content and the amount added (C4) relative to the hydrogel solid content when the chelating agent is added to the aqueous monomer solution and hydrogel twice during the production process.

In this embodiment, the C6 is preferably 51% by mass or more, more preferably 52% by mass or more, still more preferably 53% by mass or more, further still more preferably 54% by mass or more, further still more preferably 55% by mass or more, further still more preferably 56% by mass or more, further still more preferably 57% by mass or more, further still more preferably 58% by mass or more, further still more preferably 59% by mass or more, further still more preferably 60% by mass or more, further still more preferably 61% by mass or more, further still more preferably 65% by mass or more, further still more preferably 70% by mass or more, further still more preferably 75% by mass or more, and further still more preferably 80% by mass or more of the C5. Such an embodiment makes it easier to obtain a sufficient effect in the final product for the amount of a chelating agent added. In this embodiment, the C6 is, for example, 90% by mass or less, 87% by mass or less, or 85% by mass or less of the C5.

[Gel Addition Ratio]

In one embodiment of the present invention, the particulate water-absorbing agent is obtained by adding the chelating agent having a nitrogen atom to the hydrogel obtained by polymerizing the monomers in the aqueous monomer solution or the particulate hydrogel made by crushing the hydrogel, an amount C4 of the chelating agent added to the hydrogel or the particulate hydrogel is 50% by mass or more relative to the total amount C5 of the chelating agent added in the step of producing the particulate water-absorbing agent, and the content C6 of the chelating agent relative to the solid content of the particulate water-absorbing agent is 50% by mass or more of the C5. Such an embodiment makes it easier to obtain a sufficient effect in the final product for the amount of a chelating agent added when the chelating agent is added in an upstream process of the production process, such as the polymerization step.

In this embodiment, the C4 is preferably 70% by mass or more, more preferably 80% by mass or more, and still more preferably 90% by mass or more relative to the C5. According to such an embodiment, the chelating agent ratio may be in the range of 0.8 to 1.8. Note that the C4 is an amount added relative to the solid content of the hydrogel or the particulate hydrogel.

In one embodiment of the present invention, the residual ratio of a chelating agent is 50% by mass or more. Such an embodiment makes it easier to obtain a sufficient effect in the final product for the amount of a chelating agent added. Here, the residual ratio of a chelating agent is a value that can be calculated by (content C6/total amount C5)×100 (there are no particular limitations on the amount of C3 and C4 added). In one embodiment of the present invention, the residual ratio of the chelating agent is 51% by mass or more, 52% by mass or more, 53% by mass or more, 54% by mass or more, 55% by mass or more, 56% by mass or more, 57% by mass or more, 58% by mass or more, 59% by mass or more, 60% by mass or more, 61% by mass or more, 61% by mass or more, 65% by mass or more, 70% by mass or more, 75% by mass or more, 80% by mass or more, or 85% by mass or more. Such an embodiment makes it easier to obtain a sufficient effect in the final product for the amount of a chelating agent added. In one embodiment of the present invention, the residual ratio of the chelating agent is 95% by mass or less, 90 by mass or less, 87% by mass or less, or 85% by mass or less. Such an embodiment has the technical effect of giving the particulate water-absorbing agent an excellent initial color tone, that is, a white color. Alternatively, various technical effects can be expected when the chelating agent remains.

Note that in view of the purpose of the present invention, the particulate water-absorbing agent of the present invention should be defined by the content of chelating agent decomposition products, but since various compounds are assumed to be chelating agent decomposition products, it is difficult to identify the compounds and measure their contents. Therefore, in the present invention, the expression "substance" including the expression of production process (product-by-process) (e.g., the amount added in the production process) may be used.

In one embodiment of the present invention, a content (content rate) C7 (ppm by mass) of the chelating agent remaining in the particulate water-absorbing agent is 10 to 5,000 ppm, 100 to 5,000 ppm, 200 to 3,000 ppm, or 500 to 2,000 ppm. Such an embodiment has the effect of preventing coloration with the lapse of time and preventing urine degradation.

In one embodiment of the present invention, the content C6 is 10 to 5,000 ppm, more preferably 100 to 5,000 ppm, still more preferably 200 to 3,000 ppm, and still more preferably 500 to 2,000 ppm relative to the solid content (mass) of the particulate water-absorbing agent. Such an embodiment has the effect of preventing coloration with the lapse of time and preventing urine degradation.

In one embodiment of the present invention, chelating agents in the water-absorbing resin or in the particulate water-absorbing agent are quantified by methods described in Examples.

[Content of Inorganic Reducing Agent]

In one embodiment of the present invention, the content (content rate) of the inorganic reducing agent remaining in the particulate water-absorbing agent is preferably 1 to 3,000 ppm, more preferably 10 to 3,000 ppm, and still more preferably 12 to 2,000 ppm. Such an embodiment has a synergistic effect with a chelating agent to prevent coloration with the lapse of time and urine degradation. If the concentration exceeds 3,000 ppm, there is a risk of deterioration of the water-absorbing resin. In one embodiment of the present invention, the content (content rate) of the inorganic reducing agent remaining in the particulate water-absorbing agent is 20 ppm or more, 30 ppm or more, 40 ppm or more, 50 ppm or more, 60 ppm or more, 100 ppm or more, 500 ppm or more, 700 ppm or more, 800 ppm or more, 1,000 ppm or more, 1,200 ppm or more, 1,300 ppm or more, 1,500 ppm or more, 2,000 ppm or more, 2,200 ppm or more, 2,300 ppm or more, 2500 ppm or more, 3,000 ppm or more, 3,200 ppm or more, 3,300 ppm or more, 3,500 ppm or more, 4,000 ppm or more, or 4,500 ppm or more. In one embodiment of the present invention, the content (content rate) of the inorganic reducing agent remaining in the particulate water-absorbing agent is 6,000 ppm or less, 5,000 ppm or less, 4,500 ppm or less, 4,000 ppm or less, 3,500 ppm or less, 3,000 ppm or less, 2,500 ppm or less, 2,000 ppm or less, 1,500 ppm or less, 1,000 ppm or less, 500 ppm or less, or 100 ppm or less. Such a lower or upper limit allows the desired effect of the present invention to be achieved efficiently.

[Content (Content Rate) of Residual Monomer in Particulate Water-Absorbing Agent]

In one embodiment of the present invention, the content of the residual monomer in the particulate water-absorbing agent is 1,000 ppm or less. Such an embodiment can be expected to provide lower skin irritation even when the particulate water-absorbing agent is used on hygienic materials. In one embodiment of the present invention, the content (mass) of the residual monomer in the particulate water-absorbing agent is preferably 700 ppm or less, more preferably 500 ppm or less, still more preferably 300 ppm or less. The lower limit of residual monomer may be approximately 1 ppm. Note that regardless of a rate of neutralization, the content is determined by assuming that unneutralized acrylic acid is present.

[Initial Color Tone of Particulate Water-Absorbing Agent]

In one embodiment of the present invention, a particulate water-absorbing agent having a poly(meth)acrylic acid (salt)-based water-absorbing resin as a main component, comprising a chelating agent having a nitrogen atom and an inorganic reducing agent having a sulfur atom, the particulate water-absorbing agent relates to the initial color tone of the particulate water-absorbing agent and has an L-value of preferably 88 or more, more preferably 88.7 or more, still more preferably 89 or more, and still more preferably 90 or more in the Hunter Lab color system. The upper limit is 100 but in practical terms, for example, 97 or less, or 95 or less.

In one embodiment of the present invention, a particulate water-absorbing agent having a poly(meth)acrylic acid (salt)-based water-absorbing resin as a main component, comprising a chelating agent having a nitrogen atom and an inorganic reducing agent having a sulfur atom, has an a-value in the Hunter Lab color system of preferably −3 to 3, more preferably −2 to 2, and still more preferably −1 to 1. Furthermore, the b-value is preferably 0 to 6, more preferably 0 to 5, still more preferably 0 to 4, still more preferably 0 to 3, still more preferably 0 to 2, and still more preferably 0 to 1.

In one embodiment of the present invention, a particulate water-absorbing agent having a poly(meth)acrylic acid (salt)-based water-absorbing resin as a main component, comprising a chelating agent having a nitrogen atom and an inorganic reducing agent having a sulfur atom, has a degree of yellowness (YI) in the Hunter Lab color system of, in order of preference, 12 or less, 11 or less, 10 or less, 9 or less, 8 or less, 7 or less, 6.5 or less, 6 or less, 5 or less, 4 or less, 3 or less, and 2 or less.

Note that the L-value increases in degree of whiteness as it approaches 100 while the a-value, b-value, and degree of yellowness decrease in coloration as they approach 0 and are substantially white.

[Particle Shape of Particulate Water-Absorbing Agent]

In one embodiment of the present invention, the particulate water-absorbing agent has an irregularly crushed particle shape. Such an embodiment has the technical effect of making the particles appear visually white and shining through complex reflection of light. Here, an irregularly crushed shape is a crushed particle with an uneven shape. The particulate water-absorbing agent of an embodiment of the present invention is preferably the one obtained by pulverizing a resultant obtained by aqueous solution polymerization. On the other hand, spherical particles or granules of spherical particles obtained without the pulverizing step, typically by reversed-phase suspension polymerization or spray-droplet polymerization such as polymerization by spraying or dripping polymerization monomer, are not in an irregularly crushed shape. In one embodiment of the present invention, the average circularity of the particulate water-absorbing agent is preferably 0.83 or less, more preferably 0.80 or less, and still more preferably 0.75 or less. In the case of agglomerates, the average circularity of the primary particles is in the above range.

The method for calculating the average circularity is as follows: 100 or more particulate water-absorbing agents are randomly selected; each particulate water-absorbing agent is photographed with an electron microscopy (VE-9800, manufactured by KEYENCE CORPORATION) (magnification: 50×) to collect images of the particulate water-absorbing agents; and the perimeter and area of each particle is calculated using the attached image analysis software. In the case of agglomerates, the same evaluation is performed for the primary particles in front, which are easier to observe. The circularity of each particle is determined using the following formula:

$$\text{Circularity}=4\times\pi\times\text{area}/(\text{perimeter})^2 \quad \text{[Expression 1]}$$

and the average of the resulting values is calculated as the average circularity.

In one embodiment of the present invention, the CRC in the particulate water-absorbing agent is preferably 35 g/g or more, more preferably 39 g/g or more, still more preferably 40 g/g or more, and particularly preferably 41 g/g or more. Particularly, being 41 g/g or more enables both prevention of urine degradation and high fluid retention capacity, which are conventionally contradictory properties. In one embodiment of the present invention, the CRC in the particulate water-absorbing agent may be 60 g/g or less, or 50 g/g or less.

In one embodiment of the present invention, the AAP (defined in ERT442.2-02) in the particulate water-absorbing agent is preferably 10 g/g or more, more preferably 15 g/g or more, and still more preferably 20 g/g or more. In one embodiment of the present invention, the AAP in the particulate water-absorbing agent may be 40 g/g or less, or 35 g/g or less.

[Various Additives]

In one embodiment of the present invention, the particulate water-absorbing agent includes various additives. The desired functions can be imparted to the particulate water-absorbing agent by such an embodiment. In one embodiment of the present invention, various additives include, for example, the following.

Examples thereof include water insoluble inorganic fine particles (e.g., metal oxides such as silicon dioxide, titanium oxide, zinc oxide, and aluminum oxide, silicic acid (salt) such as calcium phosphate, natural zeolite, synthetic zeolite, kaolin, talc, clay, bentonite, hydrotalcite, aluminum hydroxide); water soluble deodorants (e.g., extracts from leaves of camellia plants and other known substances); polyvalent metal salts (e.g., organic and inorganic acid salts containing at least one or more metals selected from Mg, Ca, Ti, Zr, V, Cr, Mn, Co, Ni, Pd, Cu, Zn, Cd, and Al (polyvalent metal cation), specifically aluminum sulfate, aluminum lactate, polyaluminum chloride, magnesium sulfate, and zirconium sulfate); antibacterial agents; fragrances; foaming agents; pigments; dyes; plasticizers; adhesives; surfactants; fertilizers; oxidizing agents; salts; disinfectants; hydrophilic polymers such as polyethylene glycol and polyethyleneimine; hydrophobic polymers such as paraffin; thermoplastic resins such as polyethylene and polypropylene; and thermosetting resins such as polyester resin and urea resin.

In one embodiment of the present invention, the timing of addition of the various additives is not particularly limited, and is, for example, during the polymerization step, gel-crushing step, drying Step, pulverizing step, classification step, surface crosslinking step, and one or more in between each step.

In one embodiment of the present invention, in the production process of the particulate water-absorbing agent, a reducing agent (e.g., sulfite, hydrogen sulfite) is added after the drying step in order to reduce residual monomers. Thus, in one embodiment of the present invention, in the production process of particulate water-absorbing agent, a step of adding an inorganic reducing agent having a sulfur atom to the hydrogel or particulate hydrogel is used in combination with a step of adding a reducing agent (e.g., sulfite, hydrogen sulfite) after the drying step.

In one embodiment of the present invention, the particulate water-absorbing agent preferably has water insoluble inorganic fine particles having a volume-average particle size of 0.2 to 3 μm added to the particle surface of the particulate water-absorbing agent, thereby providing the technical effect of improving the initial color tone. The type of the water insoluble inorganic fine particles is not limited if they are white powders, but preferably one or more selected from titanium dioxide, aluminum oxide, calcium phosphate, hydrotalcite, or aluminum hydroxide. The volume-average particle size of the water insoluble inorganic fine particles is more preferably 0.3 to 2 μm and still more preferably 0.4 to 1.5 μm. Note that the volume-average particle size is measured by the "laser diffraction scattering method" (e.g., using product name: Microtrac MT3300II Particle Size Analyzer, manufactured by Nikkiso Co.). The actual presence of the water insoluble inorganic fine particles on the particle surface of the particulate water-absorbing agent can be confirmed by observing the particles with an electron microscopy under magnification of 5,000 times. Note that from the viewpoint of improving the initial color tone, the particle size of the water insoluble inorganic fine particles may be larger than that of fumed silica (e.g., AEROSIL™), which is frequently used in the conventional technology, (particle size of approximately several tens of nanometers), as shown above. The content of the water insoluble inorganic fine particle is preferably 0.1 to 1% by mass and more preferably 0.2 to 0.8% by mass relative to the particulate water-absorbing agent.

[3] Method for Producing Particulate Water-Absorbing Agent

In one embodiment of the present invention, provided is a method for producing a particulate water-absorbing agent having a poly(meth)acrylic acid (salt)-based water-absorbing resin as a main component, comprising a chelating agent having a nitrogen atom and an inorganic reducing agent having a sulfur atom, the method comprising: a step of making the chelating agent ratio to be 0.8 to 1.8. According to such an embodiment, it is possible to improve the residual ratio of the chelating agent in the particulate water-absorbing agent as the final product, in an embodiment involving addition of the chelating agent in the upstream process of the production process, such as in the polymerization process. Note that as for "the step of making the chelating agent ratio to be 0.8 to 1.8", descriptions in the specification (especially the above description) are applied. In addition, "main component" is synonymous with the content mentioned in [1-3] Polyacrylic Acid (Salt).

In one embodiment of the present invention, provided is a method for producing a particulate water-absorbing agent, comprising: a step of preparing an aqueous monomer solution containing (meth)acrylic acid (salt) and persulfuric acid (salt); a polymerization step of polymerizing monomers contained in the aqueous monomer solution to obtain a hydrogel; optionally, a gel-crushing step of crushing the hydrogel to obtain a particulate hydrogel; a drying step of drying the hydrogel or the particulate hydrogel to obtain a dry polymer; a step of crushing or classifying the dry polymer to obtain a water-absorbing resin powder; and a surface crosslinking step of subjecting the water-absorbing resin powder to surface crosslinking to obtain a water-absorbing resin particle, the method comprising: (i) a step of adding the chelating agent to the aqueous monomer solution at a concentration of 10 to 5,000 ppm of a monomer component (based on monomer mass); and/or (ii) a step of adding the chelating agent to the hydrogel or the particulate hydrogel at a concentration of 10 to 5,000 ppm of a solid content (mass) of the hydrogel or the particulate hydrogel; and (iii) a step of adding an inorganic reducing agent having a sulfur atom to the hydrogel or the particulate hydrogel at a concentration of 10 to 50,000 ppm of the solid content (mass) of the hydrogel or the particulate hydrogel. Hereinafter, a detailed description is provided for each step. In one embodiment of the present invention, from the viewpoint of further increasing the residual ratio of the chelating agent, it is also preferable to use steps (i) and (ii) in combination.

[Step for Preparing an Aqueous Monomer Solution]

This step is a step of preparing an aqueous monomer solution containing (meth)acrylic acid (salt) and persulfuric acid (salt).

In one embodiment of the present invention, the (meth) acrylic acid (salt) includes a polymerization inhibitor. The polymerization inhibitor is preferably phenol, more preferably methoxyphenol, and still more preferably p-methoxyphenol. The concentration of the inhibitor is preferably 10 to 200 ppm, and more preferably 10 to 100 ppm, from the viewpoint of the polymerization inhibiting effect and the color tone of the resulting water-absorbing resin or particulate water-absorbing agent. Note that it is preferable that some or all of the inhibitor remains in the particulate water-absorbing agent as the final product.

In one embodiment of the present invention, (meth) acrylic acid is partially or fully neutralized. Examples of basic substances used in this process include carbonate (hydrogen) salts of alkali metals, hydroxides of alkali metals, ammonia, and organic amines. From the viewpoint of obtaining a water-absorbing resin or particulate water-absorbing agent with higher physical properties, hydroxides of alkali metals such as sodium hydroxide, potassium hydroxide, and lithium hydroxide are preferred, and sodium hydroxide is more preferred. More specifically, an aqueous monomer solution containing (meth)acrylic acid is mixed with a basic substance, for example. In one embodiment of the present invention, the rate of neutralization of the (meth)acrylic acid (salt) is preferably 10 to 90 mol %, more preferably 40 to 85 mol %, still more preferably 50 to 80 mol %, and particularly preferably 60 to 75 mol %. Note that the rate of neutralization is also applied to the rate of neutralization of the final product, the particulate water-absorbing agent. Therefore, when (meth)acrylic acid is polymerized without neutralization or at a rate of neutralization lower than the rate of neutralization described above, neutralization can also be performed on a hydrogel-forming crosslinked polymer.

In one embodiment of the present invention, the monomer concentration in the aqueous monomer solution is preferably 10 to 80% by mass, more preferably 20 to 75% by mass, and still more preferably 30 to 70% by mass. In one embodiment of the present invention, a preferred example of aqueous solution polymerization described later is high concentration polymerization, in which the monomer concentration in the aqueous monomer solution is made high. In high concentration polymerization, the monomer concentration in the aqueous monomer solution is preferably 30% by mass or more, more preferably 35% by mass or more, and still more preferably 39% by mass or more (the upper limit is saturation concentration). Such an embodiment has the technical effect of reducing the drying step and improving the residual ratio of the chelating agent. In one embodiment of the present invention, high concentration polymerization can be used in combination with the high temperature initiation polymerization described later.

In one embodiment of the present invention, an aqueous monomer solution containing (meth)acrylic acid is mixed with an internal crosslinking agent. The internal crosslinking agent includes a compound having two or more substituents that can react with (meth)acrylic acid. Specifically, one or more of the internal crosslinking agents described in column 14 of U.S. Pat. No. 6,241,928 may be used. In one embodiment of the present invention, a compound having two or more polymerizable unsaturated groups is preferably used as the internal crosslinking agent. In one embodiment of the present invention, the internal crosslinking agent is preferably a water soluble compound that can dissolve in water at 25° C. with 1% by mass or more. Such an embodiment improves the water absorbent performance of the resulting water-absorbing resin or particulate water-absorbing agent. In one embodiment of the present invention, the amount of the internal crosslinking agent used is preferably 0.001 to 2 mol %, more preferably 0.005 to 1 mol %, and still more preferably 0.01 to 0.5 mol % relative to the monomer. According to such embodiments, the desired water-absorbing properties can be efficiently obtained.

In one embodiment of the present invention, 10 to 5,000 ppm of the chelating agent (based on the monomer mass) is added to the aqueous monomer solution. Preferably, 100 to 5,000 ppm, 200 to 4,000 ppm, 300 to 3,800 ppm, 400 to 3,500 ppm, 500 to 3,000 ppm, 600 to 2,500 ppm, 700 to 2,000 ppm, 800 to 1,900 ppm, 860 to 1,800 ppm, 870 to 1,700 ppm, or 900 to 1,650 ppm of the chelating agent is added to the aqueous monomer solution. In other words, in an embodiment of the present invention, the aqueous monomer solution contains a chelating agent in the above range. According to such an embodiment, it has the technical effect of stabilizing polymerization. Very small amounts of transition metal ions such as iron and copper ions contained in water, raw materials, and eluates from the polymerization container may cause delayed polymerization initiation and rapid polymerization. The above effect can be obtained by using a chelating agent to capture iron and copper ions.

In one embodiment of the present invention, the aqueous monomer solution contains 800 ppm or more, 860 ppm or more, 870 ppm or more, 900 ppm or more, 1,000 ppm or more, 1,200 ppm or more, 1,400 ppm or more, 1,600 ppm or more, 1,800 ppm or more, 2,000 ppm or more, 2,200 ppm or more, 2,500 ppm or more, or 3,000 ppm or more of the chelating agent based on monomer mass. In one embodiment of the invention, the aqueous monomer solution contains 5,000 ppm or less, 4,000 ppm or less, 3,800 ppm or less, 3,500 ppm or less, 3,000 ppm or less, or 2,500 ppm or less of the chelating agent based on the monomer mass.

In one embodiment of the present invention, when diethylenetriaminepentaacetic acid or a salt thereof is added as a chelating agent to the aqueous monomer solution, 2,500 ppm or less of diethylenetriaminepentaacetic acid or a salt thereof is added.

In one embodiment of the present invention, when the aqueous monomer solution is mixed with, for example, a basic substance to neutralize acrylic acid as a monomer, the temperature of the mixed solution may be 40° C. to boiling point or 50° C. to boiling point due to the action of at least one of neutralization heat and dissolution heat. In this embodiment, for example, at 40° C. to boiling point or 50° C. to 102° C., it is mixed with persulfuric acid (salt) as a polymerization initiator. According to such an embodiment, it has the technical effect of accelerating the evaporation of water during polymerization, reducing the drying step, and improving the residual ratio of the chelating agent. In one embodiment of the present invention, sodium persulfate, potassium persulfate, ammonium persulfate and the like are suitable as the persulfate.

In one embodiment of the present invention, the amount of persulfuric acid (salt) used is preferably 0.01 mol % or more, more preferably more than 0.015 mol %, more preferably 0.02 mol % or more, still more preferably 0.03 mol % or more, further still more preferably 0.04 mol % or more relative to the monomer. If the amount of persulfuric acid (salt) used is less than 0.01 mol % relative to the monomer, there is a risk of a large amount of residual monomer. Alternatively, there is a risk of failure to efficiently achieve the desired effect of the present invention. In one embodiment of the present invention, the amount of persulfuric acid (salt) used is preferably 0.5 mol % or less, more preferably 0.2 mol % or less, and still more preferably 0.15 mol % or less relative to the monomer. According to such an embodiment, it has the technical effect of improving the residual ratio of the chelating agent.

Note that in addition to the persulfate, a photo initiator, an azo initiator, or hydrogen peroxide may be used as a polymerization initiator, and a reducing agent may be used as a redox initiator. Note that even if an inorganic reducing agent having a sulfur atom is used as the reducing agent, the problem of the present invention will not be solved because the reducing agent added in the step of preparing the aqueous monomer solution is generally all consumed in the polymerization step.

In one embodiment of the present invention, the aqueous monomer solution may contain other monomers other than (meth)acrylic acid. Examples of such other monomers include water soluble or hydrophobic unsaturated monomers. Specifically, one or more of the monomers described in paragraph [0035] of U.S. Patent No. 2005/215734 (but excluding (meth)acrylic acid) are used depending on the purpose.

In one embodiment of the present invention, the aqueous monomer solution can also have the following substances added in addition to those described above. Specific examples thereof include water soluble or water-absorbing resins other than poly(meth)acrylic acid (salt), various foaming agents (e.g., carbonates, azo compounds, bubbles, etc.), surfactants, and chain transfer agents. According to such embodiments, various properties of the resulting water-absorbing resin or particulate water-absorbing agent can be improved. In this embodiment, the upper limit of the amount of water soluble resin or water-absorbing resin other than poly(meth)acrylic acid (salt) used is preferably 50% by mass or less, and more preferably 20% by mass or less in the aqueous monomer solution. In this embodiment, the upper limit of the amount of foaming agent (e.g., carbonate, azo compound, bubbles, etc.), surfactant, chain transfer agent, and the like used is 5% by mass or less, more preferably 1% by mass or less in the aqueous monomer solution. According to such an embodiment, various properties of the resulting water-absorbing resin or particulate water-absorbing agent can be improved. In one embodiment of the present invention, the use of a water soluble resin or water-absorbing resin other than poly(meth)acrylic acid (salt) gives a graft polymer or water-absorbing resin composition (e.g., starch-acrylic acid polymer, PVA-acrylic acid polymer, etc.), but these polymers and water-absorbing resin compositions are also referred to as a polyacrylic acid (salt)-based water-absorbing resin in the present invention.

[Polymerization Step]

This step is a step of polymerizing a monomer contained in the aqueous monomer solution to obtain a hydrogel-forming crosslinked polymer (hereinafter, also referred to as "hydrogel").

In one embodiment of the invention, the polymerization method is preferably spray-droplet polymerization in the gas phase, aqueous solution polymerization or reversed-phase suspension polymerization in a hydrophobic solvent, more preferably aqueous solution polymerization or reversed-phase suspension polymerization, still more preferably aqueous solution polymerization, and particularly preferably continuous aqueous solution polymerization. Such an embodiment facilitates polymerization control and improves the water-absorbing properties of the resulting water-absorbing resin.

In one embodiment of the present invention, a preferred example of aqueous solution polymerization includes high temperature initiation polymerization. In one embodiment of the present invention, the lower limit of the polymerization initiation temperature of the high temperature initiation polymerization may be 40° C. or more. In one embodiment of the present invention, the temperature is preferably 50° C. or more, more preferably 60° C. or more, and still more preferably 70° C. or more. Such an embodiment can shorten the polymerization time and improve the residual ratio of the chelating agent. In one embodiment of the present invention, the upper limit of the polymerization initiation temperature of high temperature initiation polymerization is preferably below the boiling point, and more preferably 100° C. or less, or 90° C. or less. According to such an embodiment, it has technical effect of stabilizing the polymerization. In one embodiment of the present invention, the polymerization initiation temperature of the polymerization is 40 to 100° C. According to such an embodiment, the residual ratio of the chelating agent can be improved. In the present specification, the polymerization initiation temperature is defined as the point at which the temperature begins to rise due to polymerization heat. For example, in Example 1, the polymerization initiation temperature is 95° C.

In one embodiment of the present invention, the polymerization time in the polymerization step is preferably 30 minutes or less, more preferably 15 minutes or less, and still more preferably 10 minutes or less. According to such an embodiment, the residual ratio of the chelating agent can be improved. In one embodiment of the present invention, the polymerization time in the polymerization step is preferably 10 seconds or more, more preferably 20 seconds or more, and still more preferably 30 seconds or more. According to such an embodiment, it has the technical effect of ease of controlling the polymerization. Note that in the present specification, polymerization time is defined as the time when the starting point is the start of temperature increase by polymerization heat and the ending point is the earlier of removal from the polymerization container or the start of drying (excluding evaporation of water by polymerization heat).

In one embodiment of the present invention, the polymerization step may be carried out under an air atmosphere or under an inert gas atmosphere such as nitrogen or argon. When the polymerization step is carried out under an inert gas atmosphere such as nitrogen or argon, the oxygen concentration is preferably controlled to 1% by volume or less. The dissolved oxygen in the monomer or aqueous monomer solution is also preferably replaced sufficiently by inert gas (e.g., less than 1 (mg/1) of dissolved oxygen). In one embodiment of the present invention, foam polymerization can also be used, in which bubbles (especially, the inert gas etc.) and various foaming agents (especially, carbonate) are dispersed in the aqueous monomer solution and polymerized.

[Gel-Crushing Step]

The production method in one embodiment of the present invention preferably comprises a gel-crushing step.

This step is a step of crushing the hydrogel obtained in the polymerization step to obtain a particulate hydrogel. Although there are no particular limitations on the method of crushing in the gel-crushing step, a gel crushing machine such as a kneader, meat chopper, or cutter mill is suitable. In one embodiment of the present invention, the gel crushing method described in International Publication No. WO 2011/126079 is preferably applied to the gel crushing.

In one embodiment of the present invention, a step is included in which the chelating agent is added to the hydrogel or the particulate hydrogel at a concentration of 10 to 5,000 ppm of the solid content (mass) of the hydrogel or the particulate hydrogel. In one embodiment of the present invention, a step is included in which the chelating agent is added to the hydrogel or the particulate hydrogel at a concentration of 100 to 5,000 ppm, 200 to 4,000 ppm, 300 to 3,800 ppm, 400 to 3,500 ppm, 500 to 3,000 ppm, 500 to 2,000 ppm, 600 to 1,900 ppm, 700 to 1,850 ppm, 800 to 1,800 ppm, 860 to 1,800 ppm, 870 to 1,700 ppm, or 900 to 1,650 ppm of the solid content (mass) of the hydrogel or the particulate hydrogel. According to such an embodiment, it has the technical effect of improving the residual ratio of the chelating agent. However, the distribution of the chelating agent tends to be uneven compared to the case where the chelating agent is added to the aqueous monomer solution, and the C1/C2 tends to be close to the upper limit of 1.8.

In one embodiment of the present invention, the chelating agent which may be added to the hydrogel or the particulate hydrogel is preferably in the form of a 0.01 to 20% by mass aqueous solution, more preferably in the form of a 0.01 to 10% by mass aqueous solution, and still more preferably in the form of a 0.1 to 5% by mass or 0.1 to 1% by mass aqueous solution, as a concentration calculated by assuming that the chelating agent appears at the time of addition when the chelating agent is a nonionic type, and that the chelating agent is present as an acid type in the particulate water-absorbing agent when the chelating agent is an anionic type. According to such an embodiment, the desired range of the chelating agent ratio of the present invention can be obtained.

In one embodiment of the present invention, a step is included in which an inorganic reducing agent having a sulfur atom is added to the hydrogel or the particulate hydrogel at a concentration of 10 to 50,000 ppm of the solid content (mass) of the hydrogel or the particulate hydrogel. This embodiment may be a step of adding 100 to 50,000 ppm of an inorganic reducing agent having the sulfur atoms described above.

In one embodiment of the present invention, the amount added respective to the solid content (mass) of the hydrogel or the particulate hydrogel is 200 to 50,000 ppm, 300 to 48,000 ppm, 400 to 47,000 ppm, 500 to 46,000 ppm, 520 to 46,000 ppm, 550 to 45,500 ppm, 600 to 45,000 ppm, 700 to 44,000 ppm, 900 to 42,000 ppm, 1,000 to 40,000 ppm, 1,100 to 39,000 ppm, 2,000 to 38,000 ppm, 2,200 to 37,500 ppm, 2,500 to 37,000 ppm, 3,000 to 36,000 ppm, 3,200 to 35,800 ppm, 4,500 to 35,600 ppm, 4,000 to 35,400 ppm, 4,100 to 35,400 ppm, 5,000 to 35,000 ppm, 5,200 to 35,000 ppm, 5,500 to 35,000 ppm, 6,000 to 35,000 ppm, 6,200 to 35,000 ppm, 7,000 to 34,000 ppm, 7,500 to 30,000 ppm, 8,000 to 30,000 ppm, 9,000 to 25,000 ppm, 9,500 to 23,000 ppm, 10,500 to 23,000 ppm, 12,000 to 23,000 ppm, 13,500 to 23,000 ppm, 15,000 to 23,000 ppm, 15,000 to 23,000 ppm, or 18,000 to 22,000 ppm. According to such an embodiment, it has the technical effect of improving the residual ratio of the chelating agent and the initial color tone.

In one embodiment of the present invention, the inorganic reducing agent having the sulfur atom added to the hydrogel or the particulate hydrogel is preferably in the form of a 0.01 to 30% by mass aqueous solution, more preferably in the form of a 0.01 to 20% by mass aqueous solution, and still more preferably in the form of a 0.02 to 20% by mass aqueous solution, and may be in the form of a 0.03% to 10% by mass aqueous solution, and in the form of a 0.03% to 5% by mass aqueous solution. According to such an embodiment, it has the technical effect of improving the residual ratio of the chelating agent. In one embodiment of the present invention, the inorganic reducing agent having the sulfur atom added to the hydrogel or the particulate hydrogel is in the form of a 0.5% by mass or more, 0.9% by mass or more, 1.0% by mass or more, 1.5% by mass or more, 1.8% by mass or more, 2.2% by mass or more, 2.5% by mass or more, 3% by mass or more, 3.5% by mass or more, 4.5% by mass or more, 5% by mass or more, 5.5% by mass or more, 6% by mass or more, 6.5% by mass or more, 7% by mass or more, or 7.5% by mass or more aqueous solution. In one embodiment of the present invention, the inorganic reducing agent having the sulfur atom added to the hydrogel or the particulate hydrogel is in the form of a 30% by mass or less, 20% by mass or less, 15% by mass or less, less than 10% by mass, 9% by mass or less, or 8.5% by mass or less aqueous solution. According to such an embodiment, it has the technical effect of improving the residual ratio of the chelating agent.

In one embodiment of the present invention, the inorganic reducing agent is added at the same time of the crushing of the hydrogel. Here, "at the same time" does not mean that the starting time of crushing the hydrogel and the time of adding the inorganic reducing agent must be the same, but means that the inorganic reducing agent is kneaded in while crushing the hydrogel. It is sufficient if the time of crushing and the time of addition overlap even partially. According to such an embodiment, it has the technical effect of improving the residual ratio of the chelating agent.

In one embodiment of the present invention, the chelating agent is added at the same time of the crushing of the hydrogel. Such an embodiment also means that the chelating agent is kneaded in while crushing the hydrogel. It is sufficient if the time of crushing and the time of addition overlap even partially. According to such an embodiment, it has the technical effect of improving the residual ratio of the chelating agent.

[Drying Step]

This step is a step of drying the hydrogel or the particulate hydrogel to obtain a dry polymer. In one embodiment of the present invention, the hydrogel or the particulate hydrogel is dried until the desired solids content of the resin is achieved to obtain the dry polymer. The amount of the resin solid component is a value determined from an amount lost from drying (change in mass when 1 g of the sample is heated at 180° C. for 3 hours), and is preferably 80% by mass or more, more preferably 85 to 99% by mass, still more preferably 90 to 98% by mass, and particularly preferably 92 to 97% by mass.

In one embodiment of the present invention, the drying method is a method capable of drying the hydrogel or the particulate hydrogel until it becomes the solids content of the resin described above. In one embodiment of the present invention, examples of the drying method include heating drying, hot air drying, decompression drying, fluidized bed drying, infrared drying, microwave drying, drum dryer drying, azeotropic dehydration drying with a hydrophobic organic solvent, or high humidity drying with high temperature steam. The drying step may be performed by one drying method. The drying step may be performed by two drying methods selected as appropriate.

In one embodiment of the present invention, among the above-mentioned drying methods, hot air drying is preferred from the viewpoint of drying efficiency. In one embodiment of the present invention, band drying, in which hot air drying is performed on a belt, is more preferred. In one embodiment of the present invention, the drying is preferably drying by hot air at 120 to 250° C., more preferably drying by hot air at 140 to 220° C., and still more preferably drying by hot air at 160 to 200° C. According to such an embodiment, it has the technical effects of shortening the drying time and improving the residual ratio of the chelating agent.

In one embodiment of the present invention, the drying time is preferably 120 minutes or less, more preferably 80 minutes or less, and still more preferably 60 minutes or less. According to such an embodiment, it has the technical effect of improving the initial color tone. In one embodiment of the present invention, the time of the drying is practically 1 minute or more, 3 minutes or more, and even 5 minutes or more.

In one embodiment of the present invention, among the drying, the drying time until the amount of solid component reaches 80% by mass is preferably 30 minutes or less, more preferably 20 minutes or less, and still more preferably 15 minutes or less. According to such an embodiment, it has the technical effect of improving the residual ratio of the chelating agent. In one embodiment of the present invention, the drying time until the amount of solid component reaches 80% by mass is practically 1 minute or more, and 3 minutes or more.

In one embodiment of the present invention, the band drying conditions described in International Publication No. WO 2006/100300, WO 2011/025012, Wo 2011/025013, WO 2011/111657, and the like are preferably applied when band drying is performed.

In one embodiment of the present invention, the drying is performed using a dryer selected from static dryers and band dryers. Such an embodiment has the technical effect of enabling drying in a short time even in mass production.

In one embodiment of the present invention, the layer height of the hydrogel or the particulate hydrogel stacked in the dryer is 1 to 10 cm. If the layer height of the particulate hydrogel is excessively high, there is a risk of decreasing the residual ratio of the chelating agent. In one embodiment of the present invention, the layer height of the hydrogel or the particulate hydrogel stacked in the dryer is 2 to 6 cm. Such an embodiment can improve the residual ratio of the chelating agent. In one embodiment of the present invention, the layer height of the hydrogel or the particulate hydrogel stacked in the dryer is less than 11 cm, 10 cm or less, less than 6 cm, 5 cm or less, 4.5 cm or less, or 4 cm or less. In one embodiment of the present invention, the layer height of the hydrogel or the particulate hydrogel stacked in the dryer is 1 cm or more, or 2 cm or more. Note that the layer height of a hydrogel or a particulate hydrogel is in the case of batch drying, the average of the layer heights of the stacked hydrogels or particulate hydrogels measured randomly at five or more points; and in the case of continuous band drying the average of results of all measurements in which at the point of completion of stacking, the height of the gel layer in the cross-section cut in the direction perpendicular to the direction of travel of the drying belt was measured at five equally spaced points, and the measurement was repeated every few seconds. For example, a laser distance meter or a laser displacement meter can be used as a measuring device.

Note that as for the method of achieving the desired layer height, for example, a method of adjusting the speed of the belt when conveying the hydrogel or the particulate hydrogel by the belt to the dryer is suitable, but is not limited thereto.

In one embodiment of the present invention, the time from the point of adding the inorganic reducing agent to the start of drying is 120 minutes or less, less than 120 minutes, 100 minutes or less, 80 minutes or less, 60 minutes or less, 45 minutes or less, or 30 minutes or less. Alternatively, the temperature of the hydrogel from the point of adding the inorganic reducing agent to the start of drying is 0 to 55° C. Such an embodiment can suppress degradation and coloration caused by the inorganic reducing agent. In this embodiment, the time from the point of adding the inorganic reducing agent to the start of drying is preferably 20 minutes or less, and more preferably 10 minutes or less. In this embodiment, the time from the point of adding the inorganic reducing agent to the start of drying is preferably 1 minute or more, and more preferably 3 minutes or more. In this embodiment, the temperature of the hydrogel or the particulate hydrogel is preferably 0 to 60° C., and more preferably more than 0° C. and less than 60° C., and may be 40 to 50° C. The above embodiment means that the temperature of the hydrogel or the particulate hydrogel is maintained at 0 to 55° C. from the point at which the inorganic reducing agent is added to the point at which drying is started, by means of heat retention or the like.

[Pulverizing Step and Classification Step]

This step is a step of pulverizing or classifying the dry polymer to obtain a water-absorbing resin powder. In one embodiment of the present invention, this step is a step of pulverizing the dry polymer obtained in the above drying step (pulverizing process) and adjusting the particle size to a predetermined range (classification step) to obtain a water-absorbing resin powder (the powdered water-absorbing resin before applying surface crosslinking is referred to as "water-absorbing resin powder" for convenience).

In one embodiment of the present invention, examples of equipment used in the pulverizing step include high-speed rotary mills such as roll mills, hammer mills, screw mills, and pin mills, vibration mills, knuckle-type mills, and cylindrical mixers. These may be used in combination, if necessary.

In one embodiment of the present invention, examples of the methods for adjusting the particle size in the classification step includes sieve classification using a JIS standard sieve (JIS Z8801-1 (2000)) and airflow classification. Note that the particle size adjustment of the water-absorbing resin is not limited to the above pulverizing and classification steps, and can be carried out in the polymerization step (especially reversed-phase suspension polymerization or spray-droplet polymerization) and other steps (e.g., granulating step) as appropriate.

In one embodiment of the present invention, the weight average particle diameter (D50) of the water-absorbing resin powder is preferably controlled to be 200 to 600 μm, more preferably 200 to 550 μm, and still more preferably 250 to 500 μm.

In one embodiment of the present invention, the proportion of particles with a particle size of 850 μm or more (coarse particles) is each preferably controlled to 5% by mass or less, more preferably 3% by mass or less, and still more preferably 1% by mass or less (the lower limit is 0% by mass).

In one embodiment of the present invention, the proportion of particles with a particle size of less than 850 μm is preferably 90 to 100% by mass, more preferably 95 to 100% by mass of the total.

In the present invention, particles with a particle size of less than 150 μm (fine particles) generally contained in a particulate water-absorbing agent may be reduced as described above, but since fine particles may contain a high concentration of chelating agents, a step of agglomerating fine particles with other particles to form large particles (granulating step) can be provided after the surface crosslinking step without removing fine particles in the classification step. If fine particles are removed in the classification step, a fine powder granulating step may be provided to agglomerate the fine particles to form larger particles. For the preferred fine powder granulating step, the methods described in U.S. Pat. No. 7,153,910 (fine powder granulate using hot water) and U.S. Pat. No. 8,598,254 (fine powder granulate using water and water vapor) can be applied. In one embodiment of the present invention, particles with a particle size of less than 150 μm (fine particles) are not removed from the pulverized dry polymer (water-absorbing resin powder). Alternatively, the proportion of particles with a particle size of less than 150 μm (fine particles) in the particulate water-absorbing agent may be 0.1% by mass or more, 0.3% by mass or more, or 0.5% by mass or more.

Each of the above particle sizes is measured using a JIS standard sieve in accordance with the measuring methods described in U.S. Pat. No. 7,638,570 and EDANA ERT420.2-02. The particle size is also applied to the water-absorbing resin after surface crosslinking (hereinafter, referred to as "water-absorbing resin particles" for convenience). Therefore, it is preferable that the surface crosslinking be performed to maintain the above particle size.

[Surface Crosslinking Step]

This step is a step of subjecting the water-absorbing resin powder to surface crosslinking to obtain water-absorbing resin particles. In one embodiment of the present invention, this step is a step of forming a part having a high crosslinking density in a surface layer (a part several tens of micrometers from the surface of the water-absorbing resin powder) of the water-absorbing resin powder obtained through the steps described above, and preferably comprises the following steps (1) and (2) or (1) to (3). In the surface crosslinking step, a surface crosslinked water-absorbing resin (water-absorbing resin particles) is obtained by radical crosslinking, surface polymerization, or crosslinking reaction with a surface crosslinking agent at the surface layer of the water-absorbing resin powder.

(1) Mixing Step

In one embodiment of the present invention, examples of the surface crosslinking agents used in the surface crosslinking step include, but not particularly limited to, various organic or inorganic surface crosslinking agents. Among them, organic surface crosslinking agents that react with carboxyl groups to form covalent bonds are preferred from the viewpoint of the physical properties of the water-absorbing resin or the particulate water-absorbing agent and the handling properties of the surface crosslinking agent. Specifically, one or more of the surface crosslinking agents described in columns 9 to 10 of U.S. Pat. No. 7,183,456 are used. In one embodiment of the present invention, the amount of the surface crosslinking agent used (if two or more types are used, the total amount used) is preferably 0.01 to 10 parts by mass, and more preferably 0.01 to 5 parts by mass, relative to 100 parts by mass of the water-absorbing resin powder. In one embodiment of the present invention, when adding the surface crosslinking agent to the water-absorbing resin powder, it is preferable to use water, and it is more preferable to add the agent as an aqueous solution. In this case, the amount of water used is preferably 0.1 to 20 parts by mass, and more preferably 0.5 to 10 parts by mass, relative to 100 parts by mass of the water-absorbing resin powder. In one embodiment of the present invention, a hydrophilic organic solvent is also used together with a surface crosslinking agent and water added, if necessary. There are no particular limitations on the hydrophilic organic solvent, but monoalcohols having 1 to 3 carbon atoms or glycols are suitable. Note that glycols may also be used as a surface crosslinking agent, but if the heating temperature in the heat treatment step described below is less than 150° C., they act as hydrophilic organic solvents. In one embodiment of the present invention, the amount of the hydrophilic organic solvent used is preferably 10 parts by mass or less, and more preferably 5 parts by mass or less, relative to 100 parts by mass of the water-absorbing resin powder. In one embodiment of the present invention, the method for adding and mixing the surface crosslinking agent is not particularly limited, but it is preferable to prepare the surface crosslinking agent and water, hydrophilic organic solvent, or a mixture thereof as a solvent in advance, and then add the surface crosslinking agent to the water-absorbing resin powder to mix by spraying or dropping, and more preferable to spray, add, and mix the surface crosslinking agent. In one embodiment of the present invention, the mixing device used for mixing the surface crosslinking agent and the water-absorbing resin powder is not particularly limited, but preferably a high-speed stirring type mixer, and more preferably a continuous high-speed stirring type mixer.

(2) Heat Treatment Step

In one embodiment of the present invention, the mixture of the surface crosslinking agent described above and the water-absorbing resin powder is subjected to heat treatment to cause a surface crosslinking reaction, thereby obtaining water-absorbing resin particles having a crosslinked surface. In one embodiment of the present invention, a known dryer can be applied to the heat treatment, but a paddle dryer is preferred. The heating temperature (heat medium temperature) is preferably 80 to 250° C. and more preferably 100 to 220° C. The heating time is preferably 1 to 120 minutes, more preferably 5 to 90 minutes, and still more preferably 10 to 60 minutes.

(3) Cooling Step

In one embodiment of the present invention, a cooling step is provided after the heat treatment step. The cooling step can be used to stop the surface crosslinking reaction described above, or facilitates transfer to the next step. In one embodiment of the present invention, the same type of equipment as the known dryer used in the heat treatment step is applied to the cooling treatment. At this point, the cooling temperature (refrigerant temperature) is preferably 0 to 90° C., more preferably 20 to 85° C., and more preferably 40 to 80° C.

In the above manner, it is possible to produce a particulate water-absorbing agent having a poly(meth)acrylic acid (salt)-based water-absorbing resin as a main component, containing a chelating agent having a nitrogen atom and an inorganic reducing agent having a sulfur atom, and having a predetermined chelating agent ratio of 0.8 to 1.8.

In one embodiment of the present invention, provided is the production method wherein the particulate water-absorbing agent is obtained by polymerizing monomers in an aqueous monomer solution containing a chelating agent having a nitrogen atom; an amount C3 of the chelating agent added to the aqueous monomer solution (relative to the monomer solid content) is 50% by mass or more relative to a total amount C5 of the chelating agent added in the step of producing the particulate water-absorbing agent; and a content C6 of the chelating agent relative to the solid content of the particulate water-absorbing agent is 50% by mass or more of the C5. According to such an embodiment, in an embodiment involving addition of the chelating agent in the upstream process of the production process, such as in the polymerization step, it is possible to improve the residual ratio of the chelating agent in the final product, the particulate water-absorbing agent. Note that a detailed description of such an embodiment has been given in [2] Particulate Water-Absorbing Agent, whose description is valid as well, and is therefore omitted here.

In one embodiment of the present invention, provided is the production method wherein the particulate water-absorbing agent is obtained by adding the chelating agent having a nitrogen atom to the hydrogel obtained by polymerizing monomers in an aqueous monomer solution or a particulate hydrogel made by crushing the hydrogel; an amount C4 of the chelating agent added to the hydrogel or the particulate hydrogel is 50% by mass or more relative to the total amount C5 of the chelating agent added in the step of producing the particulate water-absorbing agent; and a content C6 of the chelating agent relative to the solid content of the particulate water-absorbing agent is 50% by mass or more of the C5. According to such an embodiment, in an embodiment involving addition of the chelating agent in the upstream process of the production process, such as in the polymerization step, it is possible to improve the residual ratio of the chelating agent in the final product, the particulate water-absorbing agent. Note that a detailed description of such an embodiment has been given in [2] Particulate Water-Absorbing Agent, whose description is valid as well, and is therefore omitted here.

[4] Applications of Particulate Water-Absorbing Agent

In one embodiment of the present invention, the applications of the particulate water-absorbing agent or a particulate water-absorbing agent obtained by the production method are not particularly limited, but are preferably used for water absorbent articles such as disposable diapers, sanitary napkins, and incontinence pads.

[5] Combination of Particularly Preferred Embodiments

The embodiments disclosed in the present specification are considered to be disclosed not only as a single embodiment but also as all combination embodiments of such embodiments. The following is a description of combinations of embodiments that are particularly preferred, although they may be the basis for a lawful amendment. As follows, at least two embodiments of (i) to (xi) are provided herein as particularly preferred combinations of embodiments.

(i) In one embodiment of the invention, the chelating agent is an amino-polyvalent carboxylic acid chelating agent having four or more (or five or more) carboxylic groups, or an amino-polyvalent phosphoric acid chelating agent having four or more (or five or more) phosphonic acid groups.

(ii) In one embodiment of the present invention, the chelating agent is an amino-polyvalent carboxylic acid-based chelating agent having four or more (or five or more) carboxylic groups, or an amino-polyvalent phosphoric acid-based chelating agent having four or more (or five or more) phosphonic acid groups.

(iii) In one embodiment of the present invention, the number of sulfur atoms in one molecule of the inorganic reducing agent is one to three, one or two, or one.

(iv) In one embodiment of the present invention, the aqueous monomer solution contains 870 ppm or more, or 900 ppm or more of the chelating agent, based on the monomer mass.

(v) In one embodiment of the present invention, when the aqueous monomer solution contains diethylenetriaminepentaacetic acid or a salt thereof as the chelating agent, it contains 2,500 ppm or less of diethylenetriaminepentaacetic acid or a salt thereof.

(vi) In one embodiment of the present invention, the amount of persulfuric acid (salt) used is 0.02 mol % or more relative to the above monomer.

(vii) In one embodiment of the present invention, a step is included in which an inorganic reducing agent having a sulfur atom is added to the hydrogel or the particulate hydrogel, wherein when the C3 is 60% by mass or more, 70% by mass or more, 80% by mass or more, or 90% by mass or more relative to the C5, the amount added is 600 ppm or more of the above; and when the C4 is 70% by mass or more, 80% by mass or more, or 90% by mass or more relative to the C5, the amount added is 400 ppm or more of the above.

(viii) In one embodiment of the present invention, a step is included in which an inorganic reducing agent having a sulfur atom is added to the hydrogel or the particulate hydrogel at a concentration of 4,000 ppm or more of the solid content (mass) of the hydrogel or the particulate hydrogel.

(ix) In one embodiment of the invention, the inorganic reducing agent having a sulfur atom added to the hydrogel or the particulate hydrogel is in the form of a 3.5% by mass or more and less than 10% by mass aqueous solution.

(x) In one embodiment of the present invention, the layer height of the hydrogel or the particulate hydrogel stacked in the dryer is less than 11 cm or less than 6 cm.

(xi) In one embodiment of the present invention, the time from the point of adding the inorganic reducing agent to the start of drying is 30 minutes or less, or the temperature of the hydrogel from the point of adding the inorganic reducing agent to the start of drying is 0 to 55° C.

EXAMPLES

Unless otherwise specified, various physical properties described in the claims and Examples of the present invention were determined under the conditions of room temperature (20 to 25° C.) and humidity of 50 RH % according to the EDANA method and the following measurement methods. In addition, the electrical equipment presented in Examples and Comparative Examples was powered by 200 V or 100 V, and 60 Hz. Note that "liters" and "% by weight" are sometimes written as "L" and "wt %", respectively, for convenience. Unless otherwise stated, "%" means"% by mass".

[Production of Particulate Water-Absorbing Agent]

Example 1

(Step for Preparing an Aqueous Monomer Solution)

A solution (A) in which 10% by mass aqueous polyethylene glycol diacrylate (weight-average molecular weight; 523) solution (3.13 g, 0.02 mol % relative to acrylic acid) as an internal crosslinking agent and an aqueous solution of sodium salt of diethylenetriaminepentaacetic acid (1.32 g) as a chelating agent were added into acrylic acid (216.2 g), and a solution (B) in which 48.5% by mass aqueous sodium hydroxide solution (180.6 g) were diluted with deionized water (209.9 g) adjusted to 50° C. were each prepared in polypropylene containers with a capacity of 1.5 L and an inner diameter of 80 mm. While stirring the solution (A) using a magnetic stirrer, the solution (B) was added thereto and mixed to prepare a solution (C). Note that the temperature of the solution (C) was increased to 101° C. due to the heat of neutralization and the heat of dissolution generated during the mixing process.

Subsequently, the stirring of the solution (C) was continued, and when the temperature of the solution (C) reached 95° C., a 10% by mass of an aqueous sodium persulfate solution (3.6 g, 0.05 mol % relative to acrylic acid (sodium), 0.12 g/mol) was added to the solution (C) as a polymerization initiator and stirred for about 3 seconds to make an aqueous monomer solution (1). Note that the chelating agent content of the aqueous monomer solution (1) when converted to an acid type, in other words, the content of diethylenetriaminepentaacetic acid is 856 ppm (relative to the monomer).

(Polymerization Step)

The aqueous monomer solution (1) had a rate of neutralization of 73 mol % and a monomer concentration of 43% by mass. Next, the aqueous monomer solution (1) was poured into a vat-type container in an open-air system. Note that the vat-type container had a bottom surface of 250 mm×250 mm, a top surface of 640 mm×640 mm, a height of 50 mm, a trapezoidal central cross section, and a TEFLON® sheet attached to the inner surface. In addition, the vat-type container was placed on a hot plate heated to 100° C. and preheated. After the aqueous monomer solution (1) was poured into the vat-type container, the polymerization reaction started about 5 seconds later, raising the temperature of the aqueous monomer solution. The polymerization initiation temperature was 93° C. The polymerization reaction proceeded with the aqueous monomer solution (1) expanding and foaming upward in all directions while generating water vapor, and then the polymerization reaction was completed with the resulting hydrogel (1) shrinking to a size slightly larger than the bottom surface of the vat-type container. Note that the polymerization reaction (expansion and shrinkage) was completed within about 1 minute, but the hydrogel (1) was kept in the vat-type container for 2 minutes afterwards. A bubble-containing hydrogel (1) was obtained by this polymerization reaction. The polymerization time was 3 minutes.

(Gel-Crushing Step)

Next, the hydrogel (1) obtained by the above polymerization reaction was divided into 16 equal parts, and then a tabletop meat chopper (MEAT-CHOPPER TYPE: 12VR-400KSOX, manufactured by Iizuka Industry Co., Ltd.) having a perforated plate was used to crush the gel by adding 25 parts by mass of 0.04% by mass aqueous sodium sulfite solution at 25° C. to the hydrogel relative to 100 parts by mass (265 g) of the solid content of the hydrogel at the same time as the hydrogel was fed. Therefore, 100 ppm of sodium sulfite was added relative to the solid content of the hydrogel.

The particulate hydrogel (1) obtained by the gel crushing had a weight average particle diameter (D50) of 1.2 mm.

(Drying Step)

Next, 450 g of the particulate hydrogel (1) was spread out on a wire mesh with a mesh size of 300 μm (50 mesh) and placed in a static dryer. At that time, the layer height of the particulate hydrogel stacked in the static dryer (through-flow circulating dryer model 71-S6 (manufactured by SATAKE MultiMix Corporation)) was measured at five points and averaged, resulting in an average height of 3 cm.

On the other hand, the addition timing of an inorganic reducing agent was measured beforehand in the gel-crushing step, and the ventilation of hot air at 180° C. was started 5 minutes after the addition of the inorganic reducing agent. Note that the temperature of the hydrogel immediately after the gel crushing was confirmed to be 50° C.

Note that in the same drying step, it has been found that the amount of solid component can reach 80% by mass in 10 minutes by repeating an operation of temporarily pulling the semi-dry material out of the dryer and measuring its mass.

The ventilation of hot air was terminated 30 minutes after the start of the ventilation, thereby obtaining a dry polymer (1) in the form of particles. At this point, the amount of solid component of the dry polymer was 95% by mass.

(Pulverizing and Classification Step)

The dry polymer (1) was then fed into a roll mill (WML roll mill, manufactured by Inokuchi Giken) and pulverized, followed by classifying with a ro-tap sieve classifier using two types of JIS standard sieves with a mesh size of 850 μm and 150 μm to obtain a water-absorbing resin (1) in an irregularly crushed shape.

(Surface Crosslinking Step)

Next, a surface crosslinking agent solution (1) consisting of ethylene glycol diglycidyl ether (0.05 parts by mass), propylene glycol (1 part by mass), deionized water (3.0 parts by mass), and isopropyl alcohol (1 part by mass) was added to the water-absorbing resin (1) (100 parts by mass) in an irregularly crushed shape and mixed with a spatula until the mixture became homogeneous to obtain a humidified mixture (1). Then, the humidified mixture (1) was uniformly placed in a stainless-steel container (9 cm in diameter and about 1 cm in height) and subjected to heat treatment at 180° C. for 40 minutes to obtain a water-absorbing resin (1) subjected to the surface crosslinking.

Subsequently, the water-absorbing resin (1) subjected to the surface crosslinking was passed through a JIS standard sieve with a mesh size of 850 μm to obtain the final product, a particulate water-absorbing agent (1). The results are shown in Table below.

Example 2

A particulate water-absorbing agent (2) was produced in the same manner as in Example 1, except that the concentration of the aqueous sodium sulfite solution was set to 0.2% by mass and the amount of sodium sulfite added was set to 500 ppm relative to the solid content of the hydrogel in Example 1. The results are shown in Table below.

Example 3

A particulate water-absorbing agent (3) was produced in the same manner as in Example 1, except that the concentration of the aqueous sodium sulfite solution was set to 0.8% by mass and the amount of sodium sulfite added was set to 2,000 ppm relative to the solid content of the hydrogel in Example 1. The results are shown in Table below.

Example 4

A particulate water-absorbing agent (4) was produced in the same manner as in Example 1, except that the concentration of the aqueous sodium sulfite solution was set to 2.0% by mass and the amount of sodium sulfite added was set to 5,000 ppm relative to the solid content of the hydrogel in Example 1. The results are shown in Table below.

Example 5

A particulate water-absorbing agent (5) was produced in the same manner as in Example 1, except that the amount of sodium salt of diethylenetriaminepentaacetic acid added was changed to 43 ppm (relative to the monomer) as acid type relative to the aqueous monomer solution (1), the concentration of the aqueous sodium sulfite solution was set to 0.2% by mass, the amount of sodium sulfite added was changed to 500 ppm relative to the solid content of the hydrogel, 813 ppm of sodium salt of diethylenetriaminepentaacetic acid (relative to the solid content of the hydrogel) was added as an acid type to the aqueous sodium sulfite solution to perform the gel-crushing step in Example 1. The results are shown in Table below.

Example 6

A particulate water-absorbing agent (6) was produced in the same manner as in Example 5, except that a JIS standard sieve with a mesh size of 150 μm was not used for classification in Example 5. The results are shown in Table below.

Example 7

A particulate water-absorbing agent (7) was produced in the same manner as in Example 5, except that the concentration of the aqueous sodium sulfite solution was set to 2.4% by mass and the amount of sodium sulfite added was set to 6,000 ppm relative to the solid content of the hydrogel in Example 5. The results are shown in Table below.

Example 8

A particulate water-absorbing agent (8) was produced in the same manner as in Example 6, except that a JIS standard sieve with a mesh size of 150 μm was not used for classification in Example 7. The results are shown in the table below.

Example 9

A particulate water-absorbing agent (9) was produced in the same manner as in Example 1, except that the amount of the aqueous sodium persulfate solution added was changed to 0.055 mol % (0.13 g/mol) relative sodium acrylate, the polymerization initiation temperature was changed to 77° C., the mass of the polymerization raw material was doubled and polymerized, and instead of 100 ppm of sodium sulfite added to the hydrogel relative to the solid content of the hydrogel, 10,000 ppm of sodium hydrogen sulfite was added relative to the solid content of hydrogel at a concentration of 4% by mass of the aqueous sodium hydrogen sulfite solution to stack and dry 1 kg of a particulate hydrogel in Example 1. The results are shown in Table below. Note that the particulate hydrogel gel had a layer height of 5 cm.

Example 10

A particulate water-absorbing agent (10) was produced in the same manner as in Example 9, except that the concentration of the aqueous sodium hydrogen sulfite solution was set to 8% by mass, and the amount of sodium hydrogen sulfite added was set to 20,000 ppm relative to the solid content of the hydrogel in Example 9. The results are shown in Table below.

Example 11

A particulate water-absorbing agent (11) was produced as the same manner as in Example 9, except that 1,910 ppm of ethylenediaminetetraacetic acid was added instead of 856 ppm of sodium salt of diethylenetriaminepentaacetic acid added as an acid type, and the amount of sodium hydrogen sulfite added was set to 3,000 ppm relative to the solid content of the hydrogel at a concentration of 1.2% by mass of the aqueous sodium hydrogen sulfite solution in Example 9. The results are shown in Table below.

Example 12

A particulate water-absorbing agent (12) was produced in the same manner as in Example 11, except that 1,250 ppm of nitrilotriacetic acid was added instead 1,910 ppm of ethylenediaminetetraacetic acid added relative to the acrylic acid in Example 11. The results are shown below.

Example 13

A particulate water-absorbing agent (13) was produced in the same manner as in Example 11, except that 799 ppm of the sodium salt of ethylenediamine tetramethylene phosphonic acid was added as acid type instead of 1,910 ppm ethylenediaminetetraacetic acid added in Example 11. The results are shown in Table below.

Example 14

A particulate water-absorbing agent (14)was produced in the same manner as in Example 1, except that, the concentration of the aqueous sodium sulfite solution was set to 1.2% by mass, the amount of sodium sulfite added was changed to 6,000 ppm relative to the solid content of the hydrogel, the time from the addition of the inorganic reducing agent to the start of hot air ventilation was changed to 120 minutes, and the particulate hydrogel from the addition of the inorganic reducing agent to the start of drying was placed in a bag to prevent moisture from evaporating and kept at 60° C. in an unventilated oven in Example 1. The results are shown in Table below. Note that the ripening step was performed only in Example 14, and in other Examples and Comparative Examples (including Examples 21 to 41 described later), the time from the point of addition of the inorganic reducing agent to the start of drying ranged from 5 to 30 minutes.

Example 15

A particulate water-absorbing agent (15) was produced in the same manner as in Example 1, except that 11,800 ppm of sodium thiosulfate pentahydrate was added to the hydrogel relative to the solid content of the hydrogel instead of 100 ppm of sodium sulfite added to the hydrogel relative to the solid content of the hydrogel at a concentration of 4.7% by mass of the aqueous sodium thiosulfate pentahydrate solution in Example 1. The results are shown in Table below.

Example 16

A particulate water-absorbing agent (16) was produced in the same manner as in Example 2, except that the amount of the aqueous sodium persulfate solution added was changed to 0.015 mol % (0.04 g/mol) relative to sodium acrylate in Example 2. The results are shown in Table below.

Example 17

A particulate water-absorbing agent (17) was produced in the same manner as in Example 16, except that the concentration of the aqueous sodium sulfite solution was set to 2.4% by mass and the amount of sodium sulfite added was set to 6,000 ppm relative to the solid content of the hydrogel in Example 16. The results are shown in Table below.

Example 18

A particulate water-absorbing agent (18) was produced in the same manner as in Example 1, except that the layer height of the particulate hydrogel was changed to 6 cm during drying in Example 1. The results are shown in Table below.

Example 19

A particulate water-absorbing agent (19) was produced in the same manner as in Example 18, except that the layer height of the particulate hydrogel during drying was set to 11 cm in Example 18. The results are shown in Table below.

Example 20

A particulate water-absorbing agent (20) was produced in the same manner as in Example 1, except that the amount of deionized water added relative to the hydrogel was changed to 6 g relative to the solid content of the hydrogel, the concentration of the aqueous sodium sulfite solution was set to 10% by mass, and the amount of sodium sulfite added was changed to 6,000 ppm relative to the solid content of the hydrogel in Example 1. The results are shown in Table below.

Comparative Example 1

A comparative particulate water-absorbing agent (1) was produced in the same manner as in Example 1, except that sodium sulfite was not added in Example 1. The results are shown in Table below.

Comparative Example 2

A comparative particulate water-absorbing agent (2) was produced according to Examples 1 to 7 described in International Publication No. WO 2011/040530. The results are shown in Table below.

Comparative Example 3

A comparative particulate water-absorbing agent (3) was produced according to Example 6 described in International Publication No. WO 2015/053372. The results are shown in Table below.

Comparative Example 4

A comparative particulate water-absorbing agent (4) was produced according to Example 1 described in Japanese Patent Laid-Open No, 2003-206305. The results are shown in Table below.

Comparative Example 5

A comparative particulate water-absorbing agent (5) was produced according to Example 2 described in Japanese Patent Laid-Open No, 2003-206305. The results are shown in Table below.

Comparative Example 6

A comparative particulate water-absorbing agent (6) was produced in the same manner as in Example 1, except that 6,000 ppm of oxalic acid dihydrate was added instead of 100 ppm of sodium sulfite added relative to the solid content of the hydrogel in Example 1. The results are shown in Table below.

Comparative Example 7

A comparative particulate water-absorbing agent (7) was produced in the same manner as in Example 5, except that the sodium salt of diethylenetriaminepentaacetic acid was not added to the hydrogel, and the surface crosslinking agent solution (2), in which the deionized water was changed to 2.9 parts by mass by adding 0.0813 parts by mass of the sodium salt of diethylenetriaminepentaacetic acid to the surface crosslinking agent solution (1) as an acid type in the surface crosslinking step, was used and added to 100 parts by mass of the water-absorbing resin in an irregularly crushed shape in Example 5. The results are shown in Table below.

[Various Measurements]

[Amount of Solid Component of Water-Absorbing Resin]

The proportion of components that do not volatilize at 180° C. in a water-absorbing resin is expressed as the amount of solid component. The relationship between the amount of solid component and the moisture content is as follows:

Amount of solid component (% by mass)=100−moisture content (% by mass).

The method for measuring the amount of the solid component is as follows. About 1 g of a water-absorbing resin was weighed (mass W1) in an aluminum cap (mass W0) with a bottom diameter of about 5 cm, and the resin was left to stand for 3 hours in a still dryer at 180° C. and dried. The mass of the "aluminum cap+water-absorbing resin" after drying (W2) was measured to determine the amount of solid component by the following formula:

$$\text{Amount of solid component (\% by mass)}=((W2-W0)/W1)\times 100.$$

Note that for the block-shaped dry polymer, five pieces of samples were taken from various positions, crushed so that each particle size was 5 mnm or less, and then measured to adopt the average value.

[Amount of Solid Component of Hydrogel]

The solid content of the hydrogel in the form of particles was measured in the same method as that for measuring the "solid content of water-absorbing resin". However, the amount of hydrogel was changed to about 2 g, the drying temperature to 180° C., and the drying time to 24 hours.

[Residual Monomer]

Residual monomers were measured in accordance with the EDANA method (ERT410.2-02).

[Content, Residual Amount, and Residual Ratio of Chelating Agent]

The chelating agent in the particulate water-absorbing agent was extracted and analyzed in a method described in International Publication No. WO 2015/053372.

Specifically, 1 g of the particulate water-absorbing agent obtained in each of Example and Comparative Examples was added to 100 g of a 0.9% mass of aqueous sodium chloride solution and stirred at room temperature for 1 hour (stirring speed: 500±50 rpm) to extract the chelating agent into the 0.9% mass of the aqueous sodium chloride solution. Then, the swollen gel was filtered using filter paper (No. 2/reserved particle size defined in JIS P 3801; 5 μm/TOYO ROSHI KAISHA, Ltd.). The resulting filtrate was then passed through an HPLC sample pretreatment filter (Chromatdisk 25A/aqueous type, pore size; 0.45 μm/Kurabo Industries Ltd.), and the content of the chelating agent in the filtrate was measured using high-performance liquid chromatography (HPLC). The content of the chelating agent in the particulate water-absorbing agent was determined by using the calibration curve obtained by measuring a standard chelating agent liquid of known concentration as an external standard and considering the dilution ratio of the particulate water-absorbing agent to a 0.9% by mass of the aqueous sodium chloride solution. The measurement conditions of HPLC were changed according to the type of chelating agent as appropriate. Specifically, diethylenetriaminepentaacetic acid (DTPA), ethylenediaminetetraacetic acid (EDTA), and nitrilotriacetic acid (NTA) were quantified according to the following measurement condition 1, and ethylenediamine tetra (methylenephosphonic acid) (EDTMP) was quantified according to the following measurement condition 2.

Measurement Condition 1:

<Eluent>; A mixture of 0.3 ml of 0.4 mol/L alum solution, 450 ml of 0.1N potassium hydroxide solution, 3 ml of 0.4 mol/L tetra-n-butyl ammonium hydroxide solution, 3 ml of sulfuric acid, 1.5 ml of ethylene glycol, and 2,550 ml of ion-exchanged water <Column>; LichroCART 250-4 Superspher 100 Rp-18e (4 μm) (manufactured by Merck KGaA)

<Column temperature>; 23±2° C.

<Flow rate>; 1 ml/min

<Detector>; UV at wavelength of 258 nm.

Measurement Condition 2:

<Eluent>; 0.003 mol/L aqueous sulfuric acid solution

<Column>; Shodex IC NI-424 (manufactured by Showa Denko K.K.)

<Column temperature>; 40° C.

<Flow rate>; 1 ml/min

<Detector>; RI.

Since the content of the chelating agent above is affected by a moisture content, the content of the chelating agent in the present invention, C6, is a value corrected for the moisture content and converted relative to the solid content of the particulate water-absorbing agent. Contents of the chelating agent of the present invention, C1, C2, and C7 are values that are not corrected for the moisture content. The chelating agent is considered present as an acid type in the water-absorbing resin and the particulate water-absorbing agent when it is an anionic type. The calibration curve is prepared using the standard chelating agent liquid to which the chelating agent is added, and the conversion to the acid type is made by calculation using the molecular weight.

[Concentration of Inorganic Reducing Agent]

The inorganic reducing agent in the particulate water-absorbing agent was extracted and analyzed in a method described in International Publication No. WO 2011/040530.

Specifically, 50 g of ion exchange water and 0.5 g of a water-absorbing resin are put in a 200 ml beaker and left for 1 hour. After adding 50 g of methanol, 2.5 g of a solution in which 2 mmol of malachite green dissolved in an eluent described later is then added thereto. This solution is stirred for about 30 minutes and filtered, and the filtrate is analyzed by high-performance liquid chromatography to determine the amount of reducing agent contained in the particulate water-absorbing agent. Note that the eluent was prepared in the ratio of 400 ml of methanol, 6 ml of n-hexane, and 100 ml of 0.0 M-2-N-morpholino-ethanesulfonic acid, sodium salt. The calibration curve was prepared by analyzing the particulate water-absorbing agent without reducing agent spiked with the reducing agent. The detection limit of the inorganic reducing agent by the above analysis was 5 ppm.

[Coloration Evaluation]

The initial color tone of the water-absorbing resin was evaluated using the SZ-Σ80COLOR MEASURING SYSTEM spectrophotometer manufactured by NIPPON DENSHOKU INDUSTRIES Co., Ltd. For the measurement conditions, reflectance measurement was selected, a powder/paste sample stand with an inner diameter of 30 mm and a height of 12 mm was used, a standard round white plate No. 2 for powder/paste was used as a standard, and a 30-mm diameter floodlight pipe was used. About 5 g of the particulate water-absorbing agent obtained from Examples and Comparative Examples was filled into the provided sample stand. This filling was done in such a way that the provided sample stand was about 60% filled. The L-value (lightness: lightness index) and YI-value (degree of yellowness: yellowness index) of the surface in the Hunter Lab color system were measured with the spectrophotometer under the conditions of room temperature (20 to 25° C.) and humidity of 50 RH %. The higher the L-value, the better, and the smaller the YI-value, the lower the coloration and the closer to real white. By using the same measuring method on the same device, it is possible to measure the a- and b-values (chromaticity) of other object colors at the same time. The smaller the a and b values, the lower the coloration and the closer to real white.

[Coloring Acceleration Test]

The coloring acceleration test for water-absorbing resins was performed by putting the powder/paste sample stand containing about 5 g of water-absorbing resin, which was used in the initial coloration evaluation above, into a thermo-hygrostat adjusted to 70° C. and 65% humidity, and reserving it for 7 days. Note that, for the measurement of color tone after the coloring acceleration test, the powder/paste sample stand put into the thermo-hygrostat was disposed as it is on the same spectrophotometer as the one used for measuring the initial color tone, and the measurement was conducted under the same measurement conditions.

[Impact Test]

Thirty grams of particulate water-absorbing agent obtained in each Examples and Comparative Examples and 10 grams of glass beads with a diameter of 6 mm were put in a glass container (6 cm in diameter and 11 cm in height), and the particulate water-absorbing agent was crushed using a paint shaker (Product No. 488 test disperser, manufactured by Toyo Seiki Seisakusho, Ltd.). Note that crushing was done by vibrating the paint shaker at 800 (cycle/min) (CPM) for 30 minutes. After the vibration, the glass beads were removed using a JIS standard sieve with a mesh size of 2 mm. The details of the paint shaker (disperser) are disclosed in Japanese Patent Laid-Open No. 9-235378.

The particulate water-absorbing agent subjected to the impact test was sieved by a JIS standard sieve into a particle group 1 with a particle size of less than 300 μm and a particle group 2 with a particle size of 300 μm or more and less than 850 μm.

After quantifying a content C1 of the chelating agent present in the particle group 1 and a content C2 of the chelating agent present in the particle group 2, a chelating agent ratio (C1/C2) was obtained by dividing the C1 by the C2. The results are shown in Table below.

TABLE 1

| | | Example 1 | Example 2 | Example 3 | Example 4 | Example 5 |
|---|---|---|---|---|---|---|
| CRC | g/g | 41 | 41 | 41 | 41 | 41 |
| Residual monomer | ppm | 324 | 377 | 541 | 491 | 313 |
| Content of chelating agent C7 | ppm | 446 | 469 | 530 | 604 | 527 |
| Residual ratio of chelating agent | % | 53 | 55 | 63 | 71 | 62 |
| Content of reducing agent | ppm | N.D. | 15 | 37 | 89 | 15 |
| Initial color tone Y1 | | 12.0 | 11.5 | 9.8 | 6.5 | 11.4 |
| C1/C2 | | 1.0 | 1.0 | 1.0 | 1.0 | 1.4 |

TABLE 2

| | | Example 6 | Example 7 | Example 8 | Example 9 | Example 10 |
|---|---|---|---|---|---|---|
| CRC | g/g | 39 | 41 | 38 | 41 | 40 |
| Residual monomer | ppm | 325 | 486 | 496 | 431 | 272 |
| Content of chelating agent C7 | ppm | 602 | 693 | 749 | 676 | 702 |
| Residual ratio of chelating agent | % | 71 | 82 | 88 | 80 | 83 |
| Content of reducing agent | ppm | 17 | 74 | 74 | 881 | 2041 |
| Initial color tone Y1 | | 11.2 | 6.5 | 6.5 | 3.3 | 0.6 |
| C1/C2 | | 1.6 | 1.3 | 1.5 | 1.0 | 1.0 |

TABLE 3

| | | Example 11 | Example 12 | Example 13 | Example 14 | Example 15 |
|---|---|---|---|---|---|---|
| CRC | g/g | 41 | 40 | 41 | 43 | 39 |
| Residual monomer | ppm | 492 | 418 | 485 | 463 | 1849 |
| Content of chelating agent C7 | ppm | 961 | 679 | 410 | 637 | 605 |
| Residual ratio of chelating agent | % | 51 | 55 | 52 | 75 | 71 |
| Content of reducing agent | ppm | 55 | 61 | 53 | 53 | N/A |
| Initial color tone Y1 | | 7.1 | 7.0 | 7.5 | 16.6 | 36.0 |
| C1/C2 | | 1.0 | 1.0 | 1.0 | 1.0 | 1.0 |

TABLE 4

| | | Example 16 | Example 17 | Example 18 | Example 19 | Example 20 |
|---|---|---|---|---|---|---|
| CRC | g/g | 40 | 40 | 40 | 38 | 39 |
| Residual monomer | ppm | 762 | 975 | 458 | 321 | 630 |
| Content of chelating agent C7 | ppm | 598 | 732 | 571 | 504 | 572 |
| Residual ratio of chelating agent | % | 71 | 86 | 67 | 59 | 68 |
| Content of reducing agent | ppm | 65 | 121 | 50 | 35 | 131 |
| Initial color tone Y1 | | 6.8 | 7.2 | 6.9 | 6.8 | 7.1 |
| C1/C2 | | 1.0 | 1.0 | 1.0 | 1.0 | 1.0 |

TABLE 5

| | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| CRC | g/g | 41 | 28 | 36 | 45 | 40 | 40 | 40 |
| Residual monomer | ppm | 428 | 332 | 309 | 1210 | 29 | 518 | 255 |
| Content of chelating agent C7 | ppm | 390 | 31 | 867 | 7513 | 480 | 343 | 831 |
| Residual ratio of chelating agent | % | 46 | 18 | 98 | 97 | 62 | 41 | 98 |
| Content of reducing agent | ppm | — | 4735 | 1307 | N.D | N.D | N/A | 15 |
| Initial color tone Y1 | | 12.9 | 16.7 | 13.0 | 6.2 | 6.6 | 13.5 | 11 |
| C1/C2 | | 1.0 | 1.2 | 2.1 | 2.0 | 1.9 | 1.0 | 2.0 |

TABLE 6

| | | Example 2 | Example 5 | Comparative Example 7 |
|---|---|---|---|---|
| Color tone after coloring acceleration test | L | 78.4 | 77.5 | 72.6 |
| | a | 1.9 | 2.3 | 2.3 |
| | b | 9.5 | 10.3 | 12.7 |
| | YI | 23.7 | 24.3 | 33.9 |

[Discussion]

In Examples 1 to 6, the chelating agent was added in the upstream process of the process for production, but the residual ratio of the chelating agent was good. In contrast, in Comparative Example 1, the residual ratio of the chelating agent was poor.

In Examples 1 to 4 and 9 to 20, each particulate water-absorbing agents is obtained by polymerizing monomers in the aqueous monomer solution containing a chelating agent having a nitrogen atom, and the amount C3 of the chelating agent contained in the aqueous monomer solution added (relative to the monomer solid content) is 50% by mass or more relative to the total amount C5 of the chelating agent added in the process for production of the particulate water-absorbing agent. However, the residual ratio of the chelating agent was confirmed to be 50% or more. In Examples 5 to 8, each particulate water-absorbing agent is obtained by adding having the chelating agent having a nitrogen atom to a particulate hydrogel made by crushing a hydrogel obtained by polymerizing monomers in the aqueous monomer solution, and the amount C4 of chelating agent added to the particulate hydrogel is 50% by mass or more relative to the total amount C5 of the chelating agent added in the process for production of the particulate water-absorbing agent. However, the residual ratio of a chelating agent was confirmed to exceed 50%. This suggests that a sufficient effect is obtained in the final product for the amount of the chelating agent added. The chelating agent ratios were 0.8 to 1.8 in each Example.

In contrast, in Comparative Examples 1 (no reducing agent used) and 6 (oxalic acid used), each particulate water-absorbing agent is obtained by polymerizing monomers in the aqueous monomer solution containing a chelating agent having a nitrogen atom, and the amount C3 of the chelating agent contained in the aqueous monomer solution added (relative to the monomer solid content) is 50% by mass or more relative to the total amount C5 of the chelating agent added in the process for production of the particulate water-absorbing agent. This is presumably because the inorganic reducing agent having a sulfur atom was not added in the process for production of the particulate water-absorbing agent.

In Comparative Example 3, the amount C3 of the chelating agent contained in the aqueous monomer solution added is less than 50% by mass relative to the total amount C5 of the chelating agent added in the process for production of the particulate water-absorbing agent, the amount C4 of the chelating agent added to the particulate hydrogel is less than 50% by mass relative to the total amount C5 of the chelating agent added in the process for production of the particulate water-absorbing agent, and a large amount of the chelating agents having nitrogen atoms is added in the downstream process of the process for production of the particulate water-absorbing agent, thereby resulting in a high chelating agent ratio of 2.1. In Comparative Examples 4 and 5, each chelating agent is added to the hydrogel, but the chelating agent ratio is 1.9 to 2.0. This is presumably because the concentration of the chelating agent solution added is too high.

Comparing the color tone of Example 2 (chelating agent monomer added), Example 5 (chelating agent hydrogel added), and Comparative Example 7 (chelating agent added at the time of surface crosslinking) after the coloring acceleration test, it is apparent Examples 2 and 5 with chelating agent ratios in the range of 0.8 to 1.8 have less coloration compared to Comparative Example 7 with a chelating agent ratio of 2.0. In other words, it was shown that a chelating agent ratio of 0.8 to 1.8 is preferable for color stability.

Example 21

(Step for Preparing an Aqueous Monomer Solution)

A solution (A) in which 10% by mass aqueous polyethylene glycol diacrylate solution (9.19 g, 0.01 mol % relative to acrylic acid) and an aqueous solution of sodium salt of diethylenetriaminepentaacetic acid (7.74 g) as a chelating agent were added into acrylic acid (1,258 g), and a solution (B) in which 48.5% by mass aqueous sodium hydroxide solution (1,058 g) were diluted with deionized water (1,245 g) were each prepared in polypropylene containers with a capacity of 5 L and an inner diameter of 175 mm. While stirring the solution (A) using a magnetic stirrer, the solution (B) was added thereto and mixed to prepare a solution (C). Note that the temperature of the solution (C) was increased to 82° C. due to the heat of neutralization and the heat of dissolution generated during the mixing process.

Subsequently, the stirring of the solution (C) was continued, and when the temperature of the solution (C) reached 80° C., a 10% by mass aqueous sodium persulfate solution (22.3 g, 0.055 mol % relative to acrylic acid (sodium), 0.13 g/mol) was added to the solution (C) as a polymerization initiator and stirred for about 3 seconds to make an aqueous monomer solution (2). Note that the chelating agent content of the aqueous monomer solution (2) when converted to an acid type was 856 ppm (relative to the monomer).

(Polymerization Step)

The aqueous monomer solution (2) had a rate of neutralization of 73 mol % and a monomer concentration of 43% by mass. Next, the aqueous monomer solution (2) was poured into a vat-type container in an open-air system. Note that the vat-type container had a bottom surface of 520 mm×520 mm, a top surface of 940 mm×940 mm, a height of 300 mm, a trapezoidal central cross section, and a TEFLON® sheet attached to the inner surface. In addition, the vat-type container was placed on a hot plate heated to 100° C. and heated in advance. After the aqueous monomer solution (2) was poured into the vat-type container, the polymerization reaction started about 45 seconds later, raising the temperature of the aqueous monomer solution. The polymerization reaction proceeded with the aqueous monomer solution (2) expanding and foaming upward in all directions while generating water vapor, and then the polymerization reaction was completed with the resulting hydrogel (2) shrinking to a size slightly larger than the bottom surface of the vat-type container. Note that the polymerization reaction (expansion and shrinkage) was completed within about 1 minute, but the hydrogel (2) was kept in the vat-type container for 1.5 minutes afterwards. A bubble-containing hydrogel (2) was obtained by this polymerization reaction. The polymerization time was 2.5 minutes.

(Gel-Crushing Step)

Next, the hydrogel (2) obtained from the polymerization reaction was divided into 25 equal portions, and then supplied to a screw extruder for gel crushing. The screw extruder used was a meat chopper with a screw shaft outer diameter of 86 mm comprising a perforated plate with a diameter of 100 mm, a pore size of 9.5 mm, 31 pores, and a thickness of 10 mm at the tip. While the screw shaft rotation speed of the meat chopper was set at 115 rpm, the hydrogel (2) was supplied at 4,640 g/min, and at the same time, steam was supplied at 108 g/min, so that 0.2% by mass of an aqueous sodium hydrogen sulfite solution was 100 ppm relative to the solid content of the hydrogel.

The particulate hydrogel (2) obtained by the gel crushing had a weight average particle diameter (D50) of 3.0 mm.

(Drying Step)

Next, 1 kg of the particulate hydrogel (2) was spread out on a wire mesh with a mesh size of 300 μm (50 mesh) and placed in a static dryer. At that time, the layer height of the particulate hydrogel stacked in the static dryer was measured at five points, resulting in an average height of 5 cm.

On the other hand, the addition timing of an inorganic reducing agent was measured beforehand in the gel-crushing step, and the ventilation of hot air at 190° C. was started 5 minutes after the addition of the inorganic reducing agent. Note that the temperature of the hydrogel immediately after the gel crushing was confirmed to be 50° C.

Note that in the same drying step, it has been found that the amount of solid component can reach 80% by mass in 10 minutes by repeating an operation of temporarily pulling the semi-dry material out of the dryer and measuring its mass.

The ventilation of hot air was terminated 30 minutes after the start of the ventilation, thereby obtaining a dry polymer (2) in the form of particles. At this point, the solid component of the dry polymer was 95% by mass.

(Pulverizing and Classification Step)

The dry polymer (2) was then fed into a roll mill (WML roll mill, manufactured by Inokuchi Giken) and ground, followed by classifying with a ro-tap sieve classifier using two types of JIS standard sieves with a mesh size of 850 μm and 150 μm to obtain a water-absorbing resin (2) in an irregularly crushed shape.

(Surface Crosslinking Step)

Next, a surface crosslinking agent solution (1) consisting of ethylene glycol diglycidyl ether (0.05 parts by mass), propylene glycol (1 part by mass), deionized water (3.0 parts by mass), and isopropyl alcohol (1 part by mass) was added to the water-absorbing resin (2) (100 parts by mass) in an irregularly crushed shape and mixed with a spatula until the mixture became homogeneous to obtain a humidified mixture (2). Then, the humidified mixture (2) was uniformly placed in a stainless-steel container (width: about 22 cm, depth: about 28 cm, and height: about 5 cm) and subjected to heat treatment at 100° C. for 40 minutes to obtain a water-absorbing resin (2) subjected to the surface crosslinking.

Subsequently, the water-absorbing resin (2) subjected to the surface crosslinking was passed through a JIS standard sieve with a mesh size of 850 μm to obtain the final product, a particulate water-absorbing agent (21). The results are shown in Table below.

Examples 22 to 41

Particulate water-absorbing agents (22 to 41) were produced in the same manner as in Example 21, except that the preparation of the aqueous monomer solution, the agent (chelating agent) used therein, and the inorganic reducing agent added in the gel-crushing step were changed to values shown in Tables. The results are shown in Table below.

TABLE 7

| | | Example | | | | | |
|---|---|---|---|---|---|---|---|
| | | 21 | 22 | 23 | 24 | 25 | 26 |
| (Step for preparing an aqueous monomer solution) | | | | | | | |
| Acrylic acid | g | 1258 | 1258 | 1258 | 1258 | 1258 | 1258 |
| Internal crosslinking agent (10% by mass aqueous polyethylene glycol diacrylate solution) | | | | | | | |
| Amount added relative to acrylic acid | mol % | 0.010 | 0.010 | 0.015 | 0.030 | 0.020 | 0.020 |
| Chelating agent species 1 (sodium salt of diethylenetriaminepentaacetic acid) | | | | | | | |
| Amount added relative to monomer solid content (as acid type) | ppm | 856 | 856 | 856 | 856 | 1712 | 2569 |
| Chelating agent species 2 (sodium salt of ethylenediamine tetramethylene phosphonic acid) | | | | | | | |
| Amount added relative to monomer solid content (as acid type) | ppm | — | — | — | — | — | — |
| 48.5% by mass aqueous sodium hydroxide solution | g | 1058 | 1058 | 1058 | 1058 | 1058 | 1058 |
| Deionized water | g | 1245 | 1245 | 1245 | 1245 | 1245 | 1245 |
| (Gel-crushing step) | | | | | | | |
| Inorganic reducing agent species | | Sodium hydrogen sulfite | Sodium sulfite | Sodium sulfite | Sodium hydrogen sulfite | Sodium sulfite | Sodium hydrogen sulfite |
| Amount added relative to solid content of hydrogel | ppm | 100 | 1000 | 2000 | 4000 | 5000 | 10000 |
| Concentration of inorganic reducing agent aqueous solution | % by mass | 0.2 | 2.0 | 4.0 | 8.0 | 10 | 20 |

TABLE 8

| Example | | Example | | | | | |
|---|---|---|---|---|---|---|---|
| | | 27 | 28 | 29 | 30 | 31 | 32 |
| (Step for preparing an aqueous monomer solution) | | | | | | | |
| Acrylic acid | g | 1258 | 1258 | 1258 | 1200 | 1200 | 1317 |
| Internal crosslinking agent (10% by mass aqueous polyethylene glycol diacrylate solution) | | | | | | | |
| Amount added relative to acrylic acid | mol % | 0.020 | 0.010 | 0.010 | 0.015 | 0.020 | 0.020 |
| Chelating agent species 1 (sodium salt of diethylenetriaminepentaacetic acid) | | | | | | | |
| Amount added relative to monomer solid content (as acid type) | ppm | 2569 | — | — | — | — | — |

TABLE 8-continued

| Example | | 27 | 28 | 29 | 30 | 31 | 32 |
|---|---|---|---|---|---|---|---|
| Chelating agent species 2 (sodium salt of ethylenediamine tetramethylene phosphonic acid) | | | | | | | |
| Amount added relative to monomer solid content (as acid type) | ppm | — | 799 | 799 | 799 | 799 | 799 |
| 48.5% by mass aqueous sodium hydroxide: solution | g | 1058 | 1058 | 1058 | 1009 | 1009 | 1107 |
| Deionized water | g | 1245 | 1245 | 1245 | 1354 | 1354 | 1135 |
| (Gel-crushing step) | | | | | | | |
| Inorganic reducing agent species | | Sodium sulfite | Sodium sulfite | Sodium hydrogen sulfite | Sodium sulfite | Sodium sulfite | Sodium hydrogen sulfite |
| Amount added relative to solid content of hydrogel | ppm | 1000 | 100 | 1000 | 2000 | 4000 | 5000 |
| Concentration of aqueous inorganic reducing agent | % by mass | 2.0 | 0.2 | 2.0 | 4.0 | 8.0 | 10 |

TABLE 9

| | | Example 33 | 34 | 35 | 36 | 37 | 38 |
|---|---|---|---|---|---|---|---|
| (Step for preparing an aqueous monomer solution) | | | | | | | |
| Acrylic acid | g | 1142 | 1200 | 1142 | 1142 | 1200 | 1142 |
| Internal crosslinking agent (10% by mass aqueous polyethylene glycol diacrylate solution) | | | | | | | |
| Amount added relative to acrylic acid | mol % | 0.020 | 0.030 | 0.030 | 0.030 | 0.020 | 0.020 |
| Chelating agent species 1 (sodium salt of diethylenetriaminepentaacetic acid) | | | | | | | |
| Amount added relative to monomer solid content (as acid type) | ppm | — | — | — | — | 428 | 856 |
| Chelating agent species 2 (sodium salt of ethylenediamine tetramethylene phosphonic acid) | | | | | | | |
| Amount added relative to monomer solid content (as acid type) | ppm | 799 | 1597 | 2396 | 2396 | 399 | 799 |
| 48.5% by mass aqueous sodium hydroxide solution | g | 959 | 1009 | 959 | 959 | 1009 | 959 |
| Deionized water | g | 1463 | 1354 | 1463 | 1463 | 1354 | 1463 |
| (Gel-crushing step) | | | | | | | |
| Inorganic reducing agent species | | Sodium sulfite | Sodium hydrogen sulfite | Sodium sulfite | Sodium hydrogen sulfite | Sodium sulfite | Sodium sulfite |
| Amount added relative to solid content of hydrogel | ppm | 5000 | 5000 | 10000 | 1000 | 5000 | 10000 |

TABLE 9-continued

| | | Example | | | | | |
|---|---|---|---|---|---|---|---|
| | | 33 | 34 | 35 | 36 | 37 | 38 |
| Concentration of aqueous inorganic reducing agent | % by mass | 10 | 10 | 20 | 2.0 | 10 | 20 |

TABLE 10

| Example | | 39 | 40 | 41 |
|---|---|---|---|---|
| (Step for preparing an aqueous monomer solution ) | | | | |
| Acrylic acid | g | 1142 | 1142 | 1142 |
| Internal crosslinking agent (10% by mass aqueous polyethylene glycol diacrylate solution) | | | | |
| Amount added relative to acrylic acid | mol % | 0.020 | 0.020 | 0.020 |
| Chelating agent species 1 (sodium salt of diethylenetriaminepentaacetic acid) | | | | |
| Amount added relative to monomer solid content (as acid type) | ppm | 1712 | 1712 | 1712 |
| Chelating agent species 2 (sodium salt of ethylenediamine tetramethylene phosphonic acid) | | | | |
| Amount added relative to monomer solid content (as acid type) | ppm | 1597 | 1597 | 1597 |
| 48.5% by mass aqueous sodium hydroxide solution | g | 959 | 959 | 959 |
| Deionized water | g | 1463 | 1463 | 1463 |
| (Gel-crushing step) | | | | |
| Inorganic reducing agent species | | Sodium sulfite | Sodium hydrogen sulfite | Sodium hydrogen sulfite |
| Amount added relative to solid content of hydrogel | ppm | 1000 | 5000 | 10000 |
| Concentration of aqueous inorganic reducing agent | % by mass | 2.0 | 10 | 20 |

TABLE 11

| | | Example 21 | Example 22 | Example 23 | Example 24 | Example 25 |
|---|---|---|---|---|---|---|
| CRC | [g/g] | 45 | 44 | 42 | 35 | 39 |
| Residual monomer | [ppm] | 315 | 365 | 443 | 342 | 471 |
| Content of chelating agent C7 | [ppm] | 341 | 402 | 421 | 482 | 1028 |
| Residual ratio of chelating agent | [%] | 43 | 51 | 53 | 61 | 65 |
| Content of reducing agent | [ppm] | N.D. | 44 | 112 | 629 | 1077 |
| Initial color tone Y1 | | 12.0 | 11.0 | 9.9 | 7.7 | 6.6 |
| C1/C2 | [—] | 1.0 | 1.0 | 1.0 | 1.0 | 1.0 |

TABLE 12

| | | Example 26 | Example 27 | Example 28 | Example 29 | Example 30 |
|---|---|---|---|---|---|---|
| CRC | [g/g] | 38 | 40 | 45 | 44 | 45 |
| Residual monomer | [ppm] | 450 | 519 | 264 | 352 | 437 |
| Content of chelating agent C7 | [ppm] | 1672 | 1431 | 321 | 369 | 393 |
| Residual ratio of chelating agent | [%] | 71 | 61 | 44 | 50 | 54 |
| Content of reducing agent | [ppm] | 5214 | 40 | N.D. | 39 | 139 |
| Initial color tone Y1 | | 1.1 | 11.0 | 14.0 | 13.5 | 13.0 |
| C1/C2 | [—] | 1.0 | 1.0 | 1.0 | 1.0 | 1.0 |

TABLE 13

| | | Example 31 | Example 32 | Example 33 | Example 34 | Example 35 |
|---|---|---|---|---|---|---|
| CRC | [g/g] | 42 | 35 | 39 | 40 | 41 |
| Residual monomer | [ppm] | 309 | 138 | 146 | 273 | 109 |
| Content of chelating agent C7 | [ppm] | 408 | 442 | 412 | 934 | 1900 |
| Residual ratio of chelating agent | [%] | 56 | 60 | 56 | 64 | 86 |
| Content of reducing agent | [ppm] | 950 | 1546 | 1432 | 1410 | 4958 |
| Initial color tone Y1 | | 12.0 | 11.5 | 11.5 | 11.5 | 9.0 |
| C1/C2 | [—] | 1.0 | 1.0 | 1.0 | 1.0 | 1.0 |

TABLE 14

| | | Example 36 | Example 37 | Example 38 | Example 39 | Example 40 | Example 41 |
|---|---|---|---|---|---|---|---|
| CRC | [g/g] | 42 | 42 | 44 | 46 | 45 | 44 |
| Residual monomer | [ppm] | 453 | 155 | 99 | 504 | 387 | 101 |
| Content of chelating agent C7 | [ppm] | 1455 | 415 | 1219 | 2411 | 2594 | 2732 |
| Residual ratio of chelating agent | [%] | 66 | 54 | 80 | 79 | 85 | 90 |
| Content of reducing agent | [ppm] | 8 | 1269 | 5967 | 12 | 1916 | 5403 |
| Initial color tone Y1 | | 13.5 | 11.5 | 9.0 | 13.5 | 11.5 | 9.0 |
| C1/C2 | [—] | 1.0 | 1.0 | 1.0 | 1.0 | 1.0 | 1.0 |

[Discussion]

The same trend was observed in Examples 21 to 41 as in Examples 1 to 20.

Example 42

To 100 parts by mass of the particulate water-absorbing agent (22) in Example 22, 1 part by mass of 10% by mass aqueous sodium sulfite solution was added and mixed using a spatula until the mixture became homogeneous, then uniformly placed in a stainless-steel container (width: about 22 cm, depth: about 28 cm, and height: about 5 cm) and heated at 80° C. for 30 minutes. Subsequently, the final product, a particulate water-absorbing agent (42) was obtained by passing through a JIS standard sieve with a mesh size of 850 μm. The chelating agent ratio was 1.0 as in the case of the particulate water-absorbing agent (22). The initial color tone YI of the particulate water-absorbing agent (42) was 11.1, the residual monomer was 345 ppm, and the concentration of the reducing agent was 980 ppm.

Example 43

To 100 parts by mass of the particulate water-absorbing agent (42) in Example 42, 0.3 parts by mass of hydrotalcite (product name: DHT-6, manufactured by Kyowa Chemical Industry Co., Ltd., $Mg_6A_{12}$ $(OH)_{16}CO_3 \cdot 4H_2O$ [in general formula (1), x=0.25, m=0.50], volume-average particle size: 0.5 μm) was mixed to obtain the final product, a particulate water-absorbing agent (43). The mixing was carried out by placing 30 g of the water-absorbing resin together with hydrotalcite in a mayonnaise bottle with a capacity of 225 mL and mixing at 800 (cycle/min) (CPM) for 3 minutes by vibration of a paint shaker (Product No. 488 test disperser, manufactured by Toyo Seiki Seisakusho, Ltd.). The initial color tone YI of the particulate water-absorbing agent (43) was 9.5.

Example 44

The final product, a particulate water-absorbing agent (44), was obtained by carrying out the same procedure as in Example 43, except that 0.3 parts by mass of AEROSIL™ 200, a fumed silica, was added in place of 0.3 parts by weight of hydrotalcite in Example 43. The initial color tone YI of the particulate water-absorbing agent (44) was 10.6.

[Discussion]

The initial color tone YI of the particulate water-absorbing agent (43) with the addition of hydrotalcite having a volume-average particle size of 0.5 μm was improved compared to that of the particulate water-absorbing agent (42) and particulate water-absorbing agent (44).

The present application is based on Japanese Patent Application No. 2019-204870, filed on Nov. 12, 2019, the entire disclosure of which is incorporated herein by reference.

The invention claimed is:

1. A particulate water-absorbing agent having a poly (meth)acrylic acid (salt)-based water-absorbing resin as a main component, comprising a chelating agent having a nitrogen atom and an inorganic reducing agent having a sulfur atom, wherein the particulate water-absorbing agent has a chelating agent ratio of 0.8 to 1.2, as calculated by the following procedures (a) to (c):

(a) subjecting the particulate water-absorbing agent to a predetermined impact test;

(b) sieving the particulate water-absorbing agent subjected to the impact test into a particle group 1 with a particle size of less than 300 μm and a particle group 2 with a particle size of 300 μm or more and less than 850 μm using a JIS standard sieve; and (c) quantifying the content C1 of the chelating agent present in the particle group 1 and the content C2 of the chelating agent present in the particle group 2, and then dividing the C1 by the C2.

2. The particulate water-absorbing agent according to claim 1, wherein the color tone YI is 12 or less in an initial color tone test.

3. The particulate water-absorbing agent according to claim 1, wherein the content C7 of the chelating agent in the particulate water-absorbing agent is 10 to 5,000 ppm.

4. The particulate water-absorbing agent according to claim 1, wherein the chelating agent is at least one compound selected from the group consisting of amino-polyvalent carboxylic acids and amino-polyvalent phosphoric acids.

5. The particulate water-absorbing agent according to claim 1, wherein the inorganic reducing agent is a sulfite or a hydrogen sulfite.

6. The particulate water-absorbing agent according to claim 1, wherein the content of a residual monomer is 700 ppm or less.

7. The particulate water-absorbing agent according to claim 1, wherein the content of the inorganic reducing agent is 1 to 3,000 ppm.

8. The particulate water-absorbing agent according to claim 1, wherein a proportion of particles with a particle size of less than 850 μm is 90 to 100% by mass of the total.

9. The water-absorbing agent according to claim 1, having water insoluble inorganic fine particles with a volume-average particle size of 0.2 to 3 μm added to a particle surface of the particulate water-absorbing agent.

10. A water absorbent article, comprising the particulate water-absorbing agent according to claim 1.

* * * * *